US011002180B2

(12) United States Patent
Li et al.

(10) Patent No.: US 11,002,180 B2
(45) Date of Patent: May 11, 2021

(54) METHOD AND APPARATUS FOR SECURING COMMUNICATIONS USING MULTIPLE ENCRYPTION KEYS

(71) Applicant: Alibaba Group Holding Limited, Grand Cayman (KY)

(72) Inventors: Kepeng Li, Hangzhou (CN); Kai Li, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 238 days.

(21) Appl. No.: 15/580,829

(22) PCT Filed: Jun. 8, 2016

(86) PCT No.: PCT/CN2016/085216
§ 371 (c)(1),
(2) Date: Dec. 8, 2017

(87) PCT Pub. No.: WO2016/202207
PCT Pub. Date: Dec. 22, 2016

(65) Prior Publication Data
US 2018/0340466 A1    Nov. 29, 2018

(30) Foreign Application Priority Data

Jun. 15, 2015  (CN) .......................... 201510330914.9

(51) Int. Cl.
*H04L 29/06*    (2006.01)
*F02B 33/18*    (2006.01)
*G06F 21/60*    (2013.01)

(52) U.S. Cl.
CPC ............ *F02B 33/18* (2013.01); *G06F 21/606* (2013.01)

(58) Field of Classification Search
CPC ..... F02B 33/18; G06F 21/606; G06F 21/6245
See application file for complete search history.

(56) References Cited

U.S. PATENT DOCUMENTS

| 4,634,808 A | 1/1987 | Moerder |
| 5,224,166 A | 6/1993 | Hartman, Jr. |

(Continued)

FOREIGN PATENT DOCUMENTS

| CN | 102663844 A | 9/2012 |
| CN | 102930225 A | 2/2013 |

(Continued)

OTHER PUBLICATIONS

International Search Report to corresponding International Application No. PCT/CN2016/085216, dated Sep. 20, 2016 (2 pages).

*Primary Examiner* — Wasika Nipa
(74) *Attorney, Agent, or Firm* — James J. DeCarlo; Greenberg Traurig, LLP

(57) ABSTRACT

The disclosure provides a method and an apparatus for acquiring an electronic file. The method for acquiring an electronic file comprises: sending a first request message for acquiring an electronic file to a platform server, wherein the first request message carries a first identifier of an information providing server providing the electronic file; receiving first prompt information returned from the platform server according to the first request message; determining first verification information for identity authentication according to the first prompt information, and sending the first verification information to the platform server; and receiving the electronic file forwarded by the platform server, wherein the electronic file is from the information providing server, and private information in the electronic file is encrypted through a first encryption key of the information providing server. The technical solutions in the disclosed embodiments can effectively protect private information of a user from being leaked by a platform server, thereby ensuring privacy security of the user.

20 Claims, 25 Drawing Sheets

(56) References Cited

U.S. PATENT DOCUMENTS

| | | | |
|---|---|---|---|
| 5,636,280 A | 6/1997 | Kelly | |
| 6,044,154 A | 3/2000 | Kelly | |
| 6,263,435 B1 | 7/2001 | Dondeti et al. | |
| 7,661,146 B2 | 2/2010 | Karimzadeh et al. | |
| 7,908,487 B2 | 3/2011 | Williams et al. | |
| 8,212,677 B2 | 7/2012 | Ferguson | |
| 8,316,237 B1 * | 11/2012 | Felsher | H04L 9/0825 |
| | | | 713/171 |
| 8,498,884 B2 | 7/2013 | Maitland et al. | |
| 8,552,868 B1 | 10/2013 | Ferguson | |
| 8,849,718 B2 | 9/2014 | Dala et al. | |
| 9,141,758 B2 | 9/2015 | Kress et al. | |
| 9,158,933 B2 | 10/2015 | Banks et al. | |
| 2003/0018495 A1 | 1/2003 | Sussman | |
| 2003/0223585 A1 * | 12/2003 | Tardo | H04L 9/3226 |
| | | | 380/277 |
| 2004/0230489 A1 * | 11/2004 | Goldthwaite | G06Q 30/0601 |
| | | | 705/26.1 |
| 2007/0180259 A1 | 8/2007 | Bulot et al. | |
| 2008/0040602 A1 * | 2/2008 | Williams | H04L 67/02 |
| | | | 713/153 |
| 2008/0222042 A1 | 9/2008 | Moore et al. | |
| 2013/0110540 A1 | 5/2013 | Kimberling | |
| 2013/0252585 A1 * | 9/2013 | Moshir | G06F 21/35 |
| | | | 455/411 |
| 2014/0156296 A1 | 6/2014 | Stenzler et al. | |
| 2014/0236635 A1 | 8/2014 | Liberty et al. | |
| 2014/0344943 A1 | 11/2014 | Todeschini et al. | |
| 2015/0213204 A1 | 7/2015 | Bose et al. | |

FOREIGN PATENT DOCUMENTS

| | | |
|---|---|---|
| CN | 103824031 A | 5/2014 |
| CN | 104104657 A | 10/2014 |
| CN | 104660557 A | 5/2015 |

* cited by examiner

METHOD AND APPARATUS FOR SECURING COMMUNICATIONS USING MULTIPLE ENCRYPTION KEYS

CROSS-REFERENCE TO RELATED APPLICATIONS

This application claims priority to Chinese Patent Application No. 201510330914.9, filed on Jun. 15, 2015 entitled "METHOD AND APPARATUS FOR ACQUIRING ELECTRONIC FILE", and PCT Application No. PCT/CN2016/085216 filed on Jun. 8, 2016 entitled "METHOD AND APPARATUS FOR ACQUIRING ELECTRONIC FILE," both of which are incorporated herein by reference in their entirety.

BACKGROUND

Technical Field

The disclosure relates to the field of cryptography, and in particular, to a method and an apparatus for securing communications between multiple parties using multiple encryption keys.

Description of Related Art

In order to strengthen the circulation management on circulation of prescription drugs and ensure safety and effectiveness in drug usage of people, prescription drugs can be sold only with paper prescriptions issued by doctors. Our country is now gradually opening selling of prescription drugs online to further reduce country and fellowmen's medical costs and improve medicine purchasing convenience. Compared with paper prescriptions, electronic prescriptions have the following advantages: standard formats, complete and clear contents, and convenience for doctors and patients in querying historical records; and electronic prescriptions are the basis for promoting selling prescription drugs online at a large scale.

In order to protect a patent's private information included in an electronic prescription, the private information of the patient such as the name, medical record number, and address of the patient are hidden, deleted, or encrypted/decrypted in the process of using the electronic prescription. However, users using an electronic prescription include different roles, such as doctors, patients, and pharmacies. In addition, when a doctor reviews past diagnosis and treatment information of a patient, or when a supervision department carries out a case examination, patient identity included in an electronic prescription needs to be checked and reviewed. Therefore, simply hiding or deleting identity information of a patient makes it unable to trace past medical records of the patient due to loss of key information of the patient.

BRIEF SUMMARY

In accordance with the problems described above, the disclosure provides a novel technical solution for solving the technical problems in current systems that a patent's private information cannot be protected effectively.

In order to achieve the aforementioned objective, the disclosure provides the following technical solutions.

According to a first aspect of the disclosure, a method for acquiring an electronic file is provided, applied to a terminal device, the method comprising: sending a first request message for acquiring an electronic file to a platform server, wherein the first request message carries a first identifier of an information providing server providing the electronic file; receiving first prompt information returned from the platform server according to the first request message; determining first verification information for identity authentication according to the first prompt information, and sending the first verification information to the platform server; and after the platform server determines the information providing server according to the first identifier, determines a user identifier registered by a user of the terminal device with the information providing server according to first login information of the user on the platform server, and sends the first verification information and the user identifier to the information providing server, receiving the electronic file from the information providing server forwarded by the platform server, wherein private information in the electronic file is encrypted through a first encryption key of the information providing server.

According to a second aspect of the disclosure, a method for acquiring an electronic file is provided, applied to a platform server, the method comprising: receiving a first request message for acquiring an electronic file from a terminal device, wherein the first request message carries a first identifier of an information providing server providing the electronic file; returning first prompt information to the terminal device according to the first request message; after the terminal device determines first verification information for identity authentication according to the first prompt information, receiving the first verification information from the terminal device; determining the information providing server according to the first identifier, and sending to the information providing server the first verification information and a user identifier registered by a user of the terminal device with the information providing server; and after the information providing server successfully verifies the first verification information and the electronic file is determined according to the user identifier, receiving the electronic file from the information providing server and forwarding the electronic file to the terminal device, wherein private information in the electronic file is encrypted through a first encryption key of the information providing server.

According to a third aspect of the disclosure, a method for acquiring an electronic file is provided, applied to an information providing server, the method comprising: receiving first verification information from a platform server and a user identifier registered by a user of a terminal device with the information providing server; verifying the first verification information, and determining the electronic file according to the user identifier after a successful verification; encrypting private information in the electronic file through a first encryption key of the information providing server; and sending the electronic file to the platform server, so that the platform server forwards the electronic file to the terminal device.

According to a fourth aspect of the disclosure, an apparatus for acquiring an electronic file is provided, applied to a terminal device, the apparatus comprising: a first sending module, configured to send a first request message for acquiring an electronic file to a platform server, wherein the first request message carries a first identifier of an information providing server providing the electronic file; a first receiving module, configured to receive first prompt information returned from the platform server according to the first request message sent by the first sending module; a first determining module, configured to determine first verification information for identity authentication according to the first prompt information received by the first receiving module, and send the first verification information to the platform server; and a second receiving module, configured to receive the electronic file from the information providing server that is forwarded by the platform server after the platform server determines the information providing server according to the first identifier, determines a user identifier registered by a user of the terminal device with the information providing server according to first login information of the user on the platform server, and sends the first verification information determined by the first determining module and the user identifier to the information providing server, wherein private information in the electronic file is encrypted through a first encryption key of the information providing server.

According to a fifth aspect of the disclosure, an apparatus for acquiring an electronic file is provided, applied to a platform server, the apparatus comprising: a ninth receiving module, configured to receive a first request message for acquiring an electronic file from a terminal device, wherein the first request message carries a first identifier of an information providing server providing the electronic file; a seventh sending module, configured to return first prompt information to the terminal device according to the first request message received by the ninth receiving module; an eighth sending module, configured to, after the terminal device determines first verification information for identity authentication according to the first prompt information sent by the seventh sending module, receive the first verification information from the terminal device; a ninth sending module, configured to determine the information providing server according to the first identifier received by the ninth receiving module, and send to the information providing server the first verification information and a user identifier registered by a user of the terminal device with the information providing server; and a first forwarding module, configured to, after the information providing server successfully verifies the first verification information sent by the ninth sending module and the electronic file is determined according to the user identifier, receive the electronic file from the information providing server and forward the electronic file to the terminal device, wherein private information in the electronic file is encrypted through a first encryption key of the information providing server.

According to a sixth aspect of the disclosure, an apparatus for acquiring an electronic file is provided, applied to an information providing server, the apparatus comprising: a sixteenth receiving module, configured to receive first verification information from a platform server and a user identifier registered by a user of a terminal device with the information providing server; a third verification module, configured to verify the first verification information received by the sixteenth receiving module, and determine the electronic file according to the user identifier after a successful verification; a third encryption module, configured to encrypt private information in the electronic file through a first encryption key of the information providing server; and a fifteenth sending module, configured to send the electronic file encrypted by the third encryption module to the platform server, so that the platform server forwards the electronic file to the terminal device.

It can be seen from the above technical solutions that in the disclosure, private information in an electronic file is encrypted and protected through a first encryption key. Since a platform server does not have the first encryption key of an information providing server, even if the electronic file is stolen on the platform server, a thief cannot obtain cleartext private information of a user. A manager on the platform server side cannot acquire the cleartext private information of the user either, thereby effectively protecting the private information of the user from being leaked by the platform server and ensuring privacy security of the user.

DETAILED DESCRIPTION

Figure 1:
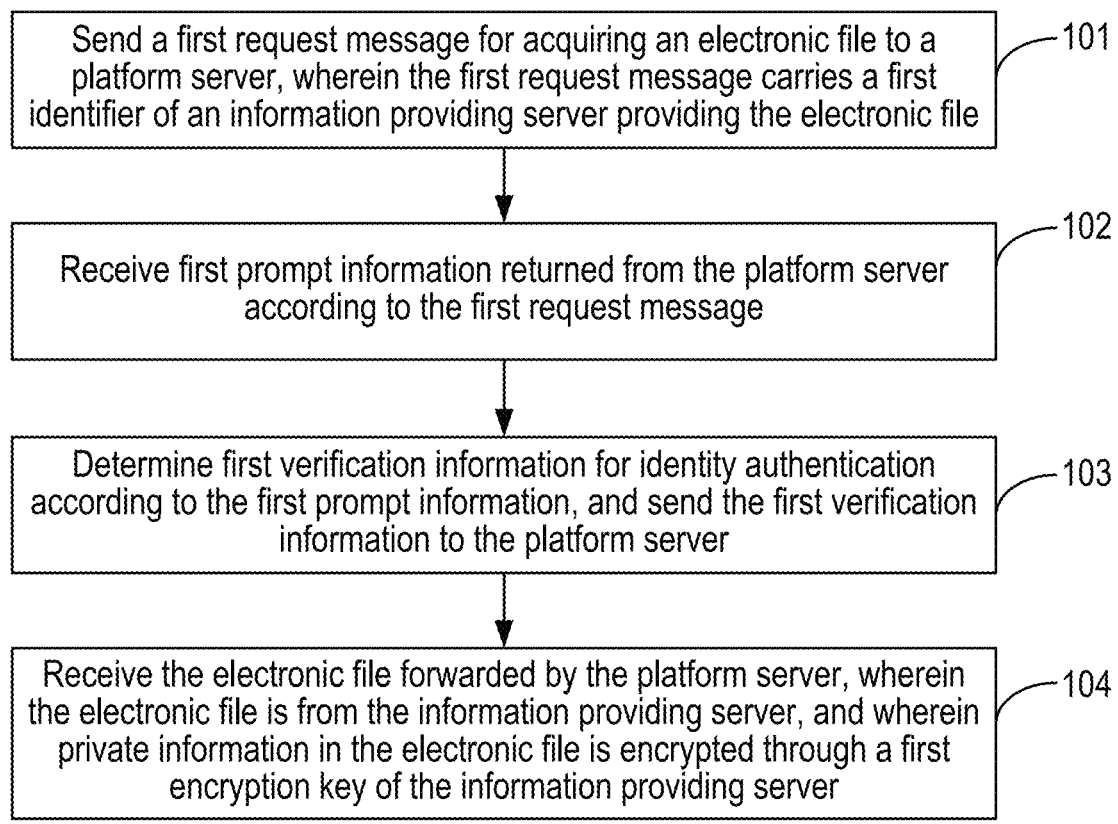
FIG. 1 is a flow diagram illustrating a method for acquiring an electronic file shown according to some embodiments of the disclosure.

Exemplary embodiments will be described in detail here, and examples thereof are shown in the drawings. The following description refers to the drawings and the same numbers in different drawings represent the same or similar elements unless otherwise indicated. Implementations described in the following exemplary embodiments are not representative of all embodiments consistent with the disclosure. Instead, they are merely examples of apparatuses and methods consistent with some aspects of the disclosure as recited in the appended claims.

The terms used in the disclosure are only for the purpose of describing particular embodiments and are not intended to limit the disclosure. The singular forms "a", "an", and "the" used in the disclosure and the appended claims are also intended to include plural forms, unless the context clearly indicates otherwise. It should also be understood that the term "and/or" as used herein refers to and encompasses any or all possible combinations of one or more of the associated listed items.

It should be understood that although various types of information may be described through terms such as first, second, and third in the disclosure, such information should not be limited by these terms. These terms are only used to distinguish one type of information from another type of information. For example, first information may also be referred to as second information; and similarly, second information may also be referred to as first information without departing from the scope of the disclosure. Depending on the context, the word "if" as used herein may be construed to mean "when . . . " or "upon . . . " or "in response to determining".

In the disclosure, private information in an electronic file is encrypted and protected through a first encryption key. Since a platform server does not have the first encryption key of an information providing server, a thief cannot obtain cleartext private information of a user even if the electronic file is stolen on the platform server. A manager on the platform server side cannot acquire the cleartext private information of the user either, thereby effectively protecting the private information of the user from being leaked by the platform server and ensuring privacy security of the user.

The following embodiments are provided to further describe the disclosure.

FIG. 1 is a flow diagram illustrating a method for acquiring an electronic file shown according to some embodiments of the disclosure. This embodiment, in a first embodiment, may be applied to a terminal device. In one embodiment, the terminal device may be a smart phone, a tablet computer, a personal computer, or the like, and may communicate with a platform server and an information providing server through an application or a browser on the terminal device. As shown in FIG. 1, the method includes the following steps.

Step 101: Send a first request message for acquiring an electronic file to a platform server, wherein the first request message carries a first identifier of an information providing server providing the electronic file.

Step 102: Receive first prompt information returned from the platform server according to the first request message.

Step 103: Determine first verification information for identity authentication according to the first prompt information, and send the first verification information to the platform server.

Step 104: After the platform server determines the information providing server according to the first identifier, determines a user identifier registered by a user of the terminal device with the information providing server according to first login information of the user on the platform server, and sends the first verification information and the user identifier to the information providing server, receive the electronic file forwarded by the platform server, wherein the electronic file is from the information providing server, and wherein private information in the electronic file is encrypted through a first encryption key of the information providing server.

In one embodiment of step 101, the platform server serves as a network platform connecting the terminal device and the information providing server. Alternatively, or in conjunction with the foregoing, the platform server may be provided by an e-commerce platform. Different terminal devices and different information providing servers may transmit electronic files through the platform server. In one embodiment, the electronic file may be an electronic prescription, the information providing server may be a hospital information system ("HIS"), and the platform server may be an electronic prescription platform ("EPP"). In another embodiment, the electronic file may also be a social security file of the user, the information providing server may be a social security service system, and the platform server may be a social security information platform. In yet another embodiment, the electronic file may also be a housing provident fund bill of the user, the information providing server may be a provident fund service system, and the platform server may be a provident fund information platform.

It can be seen that the specific content of the electronic file is not limited in the disclosure and any electronic file requiring encryption protection performed through the disclosure can be the electronic file in the disclosure. This embodiment is exemplarily described using the electronic file being specifically an electronic prescription as an example. In one embodiment, the first request message may carry a first identifier, and in one example, the first identifier is a hospital code HIS_ID corresponding to a user of a terminal device on an HIS. If the first request message does not carry a prescription number P_ID (e.g., a second identifier) of the electronic prescription, the HIS may determine, according to the issuing time of the electronic prescription, that the user needs the latest electronic prescription. If the second identifier is carried, the HIS may provide an electronic prescription corresponding to the second identifier to the user.

In one embodiment of steps 102 and 103, the first verification information may be generated by encrypting first original verification information input by the user at the terminal device through a first encryption key. The first original verification information is, for example, an identity card number of the user or the last four digits of the identity card number, or the name of the user. In one embodiment, first original verification information input by the user at the terminal device may be determined according to first prompt information and a first encryption key of the information providing server may be determined. The first original verification information is encrypted according to the first encryption key to obtain first verification information for identity authentication. The first verification information is encrypted through the first encryption key of the information providing server, so the platform server cannot acquire original verification information of the user. For example, if the first verification information to be determined according to the first prompt information is an identity card number of the user, and the identity card number is encrypted through the first encryption key and then sent to the platform server, the platform server cannot acquire the cleartext identity card number of the user. As a result, the cleartext verification information of the user is guaranteed to be kept confidential on the platform server.

In one embodiment on step 104, private information in the electronic file may be, for example, the name, identity card number, mobile phone number, and home address of the user. The private information is encrypted through the first encryption key so that the platform server cannot acquire the private information of the user in the electronic file. In one embodiment, if the information providing server uses a symmetric encryption algorithm, the first encryption key on the information providing server may be the same as the first decryption key of the information providing server. The symmetric encryption algorithm may be DES (Data Encryption Standard), 3DES (Triple DES), AES (Advanced Encryption Standard), and so on. If the information providing server uses an asymmetric encryption algorithm, the first encryption key may be a public key of the information providing server, and the first decryption key of the information providing server may be a private key of the information providing server. In one embodiment, the asymmetric encryption algorithm used by the information providing server may be RSA (Rivest Shamir Adlemen), Elgamal, a knapsack algorithm, Rabin, D-H (Diffie-Hellman), elliptic curve cryptography (ECC), and so on.

In this embodiment, private information in an electronic file is encrypted and protected through a first encryption key. Since a platform server does not have the first encryption key of an information providing server, a theft cannot obtain cleartext private information of a user even if the electronic file is stolen on the platform server. A manager on the platform server side cannot acquire the cleartext private information of the user either, thereby effectively protecting the private information of the user from being leaked by the platform server and ensuring privacy security of the user.

Figure 2:
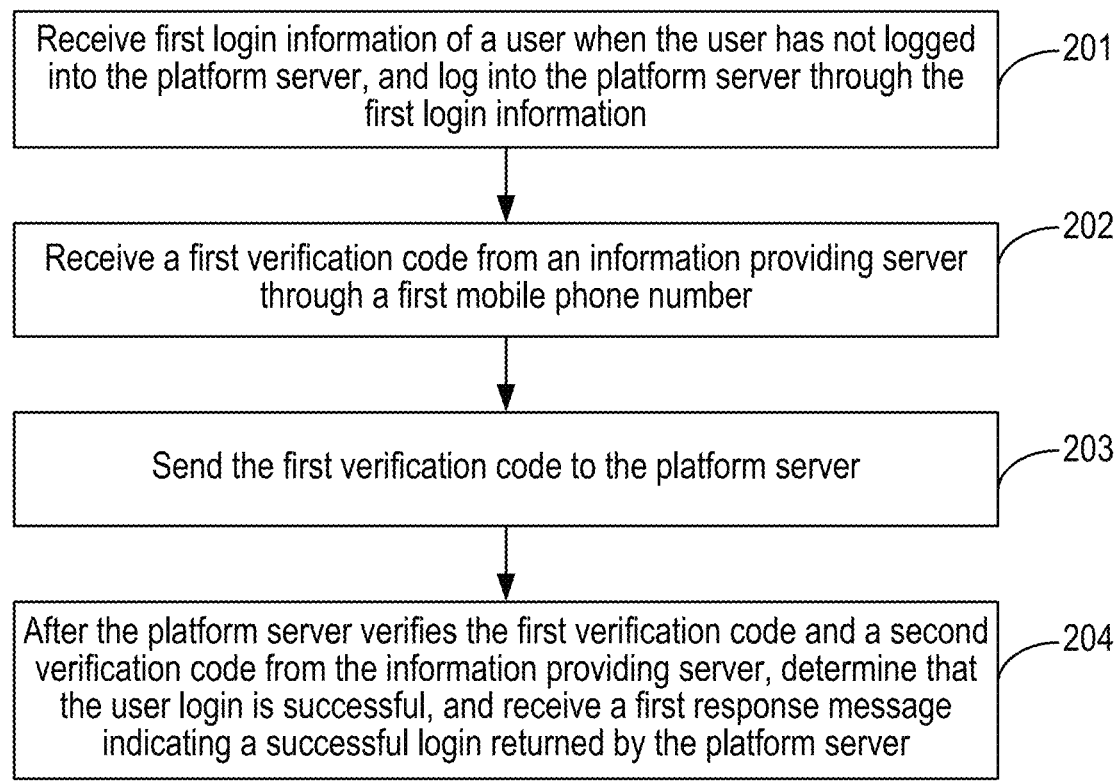
FIG. 2 is a flow diagram illustrating a method for acquiring an electronic file shown according to some embodiments of the disclosure.

FIG. 2 is a flow diagram illustrating a method for acquiring an electronic file shown according to some embodiments of the disclosure. This embodiment is exemplarily described using a user needing to log into a platform server through a terminal device as an example, and includes the following steps.

Step 201: Receive first login information of a user when the user has not logged into the platform server, and log into the platform server through the first login information.

Step 202: Receive a first verification code from an information providing server through a first mobile phone number, wherein the first verification code is sent to the first mobile phone number by the information providing server under the instruction of the platform server according to a second mobile phone number, and the second mobile phone number is obtained by encrypting the first mobile phone number through a first encryption key.

Step 203: Send the first verification code to the platform server.

Step 204: After the platform server verifies the first verification code and a second verification code from the information providing server, determine that the user login is successful, and receive a first response message indicating a successful login returned by the platform server.

In one embodiment of step 201, the first login information may include a login name and a login password of the user on the platform server, wherein the login name may be a cleartext mobile phone number of the user. The cleartext mobile phone number of the user is encrypted through a first encryption key to generate the first login information. The user logs into the platform server through the encrypted mobile phone number, thus ensuring that the platform server cannot acquire the cleartext mobile phone number of the user.

In one embodiment of steps 202 and 203, after the user logs into the platform server through the first login information, a second mobile phone number encrypted through the first encryption key and provided by the user when registering with the platform server may be determined based on the first login information. In another embodiment, if the login name in the first login information is a second mobile phone number, the second mobile phone number may be determined through the login name in the first login information. Thus, the platform server may request the information providing server to send a first verification code to a terminal device corresponding to the second mobile phone number. After receiving the second mobile phone number, the information providing server decrypts the second mobile phone number through a first decryption key of the information providing server to obtain the original first mobile phone number registered by the user with the information providing server, and then sends the first verification code to the terminal device through the first mobile phone number. In one embodiment, the first verification code may be a short message verification code.

In one embodiment of step 204, the information providing server may send a second verification code to the platform server when sending the first verification code to the terminal device. Then the terminal device sends the first verification code to the platform server. Therefore, when verifying the first verification code, the platform server may compare the first verification code with the second verification code to see whether they have the same content. If so, the verification is successful, and it is determined that the user login is successful.

In this embodiment, when a user needs to log into a platform server, cleartext login information of the user is encrypted through a first encryption key. The platform server is being logged into through encrypted first login information. When data on the platform server is leaked, the first login information stolen from the platform server by a thief is encrypted data. That is, the thief cannot obtain the original login information of the user, and cannot log into the platform server through the login information obtained from the platform server, thereby effectively preventing the thief from illegally logging into the platform server through the login information stolen from the platform server and ensuring security of login information of the user.

Figure 3:
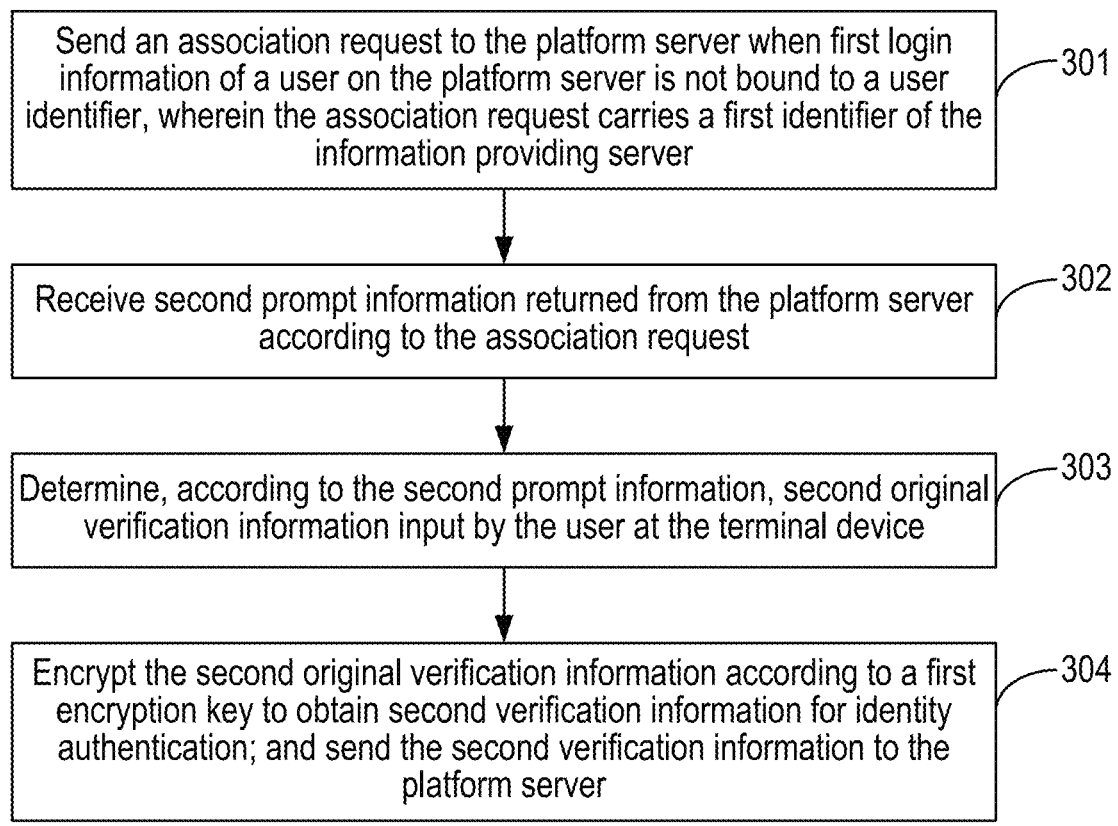
FIG. 3 is a flow diagram illustrating a method for acquiring an electronic file shown according to some embodiments of the disclosure.

FIG. 3 is a flow diagram illustrating a method for acquiring an electronic file shown according to some embodiments of the disclosure. This embodiment is exemplarily described using a user needing to bind first login information of the user on a platform server to a user identifier of the user generated on an information providing server as an example. As shown in FIG. 3, the method includes the following steps.

Step 301: Send an association request to the platform server when first login information of a user on the platform server is not bound to a user identifier, wherein the association request carries a first identifier of the information providing server.

Step 302: Receive second prompt information returned from the platform server according to the association request.

Step 303: Determine, according to the second prompt information, second original verification information input by the user at the terminal device.

Step 304: Encrypt the second original verification information according to a first encryption key to obtain second verification information for identity authentication; and send the second verification information to the platform server, wherein the platform server forwards a binding request and the second verification information to the information providing server, so that the information providing server decrypts the second verification information according to a first decryption key corresponding to the first encryption key; determines the user identifier of the user on the information providing server according to the decrypted second verification information, and returns the user identifier to the platform server, so that the platform server may establish a binding relationship between the first login information and the user identifier.

In one embodiment, the user identifier may be a unique identifier of the user on the information providing server. The user identifier does not contain private information of the user. The platform server may use the identifier as an index when initiating a request for an electronic prescription to the information providing server. This is to avoid having the need for the information providing server to decrypt a second mobile phone number from the platform server to obtain a first mobile phone number, and to avoid having to use the first mobile phone number later as an index for searching for a corresponding electronic file each time.

This embodiment is described using the platform server being an EPP and the information providing server being an HIS as an example, a terminal device logs into the EPP through a second mobile phone number, wherein the second mobile phone number is obtained by encrypting an original first mobile phone number through a first encryption key of the HIS information providing server. The terminal device sends an association request to the EPP, wherein the association request carries HIS_ID. After a user of the terminal device inputs an identity card number according to a prompt of the EPP, the identity card number is encrypted through the first encryption key to obtain second verification information. The EPP sends to the HIS the second mobile phone number, the second verification information, and a second encryption key of the EPP, and requests the HIS to verify the second verification information. The HIS returns a user identifier to the EPP after the verification on the second verification information is successful. The EPP stores the second verification information and stores an association between the second mobile phone and the user identifier. In one embodiment, the HIS may generate the user identifier based on the first mobile phone number.

In this embodiment, an information providing server verifies second verification information from a platform server to assist the platform server in achieving the goal of secondary identity authentication. On the platform server, since the second verification information is generated by encrypting second original verification information through a first encryption key of the information providing server, the platform server cannot acquire cleartext verification information of a user of a terminal device. It is then possible to prevent a data thief from stealing the verification information of the user of the terminal device. The design also prevents an invalid user from binding first login information of a valid user on the platform server to a user identifier of the user on the information providing server through an invalid association request to the platform server.

Figure 4:
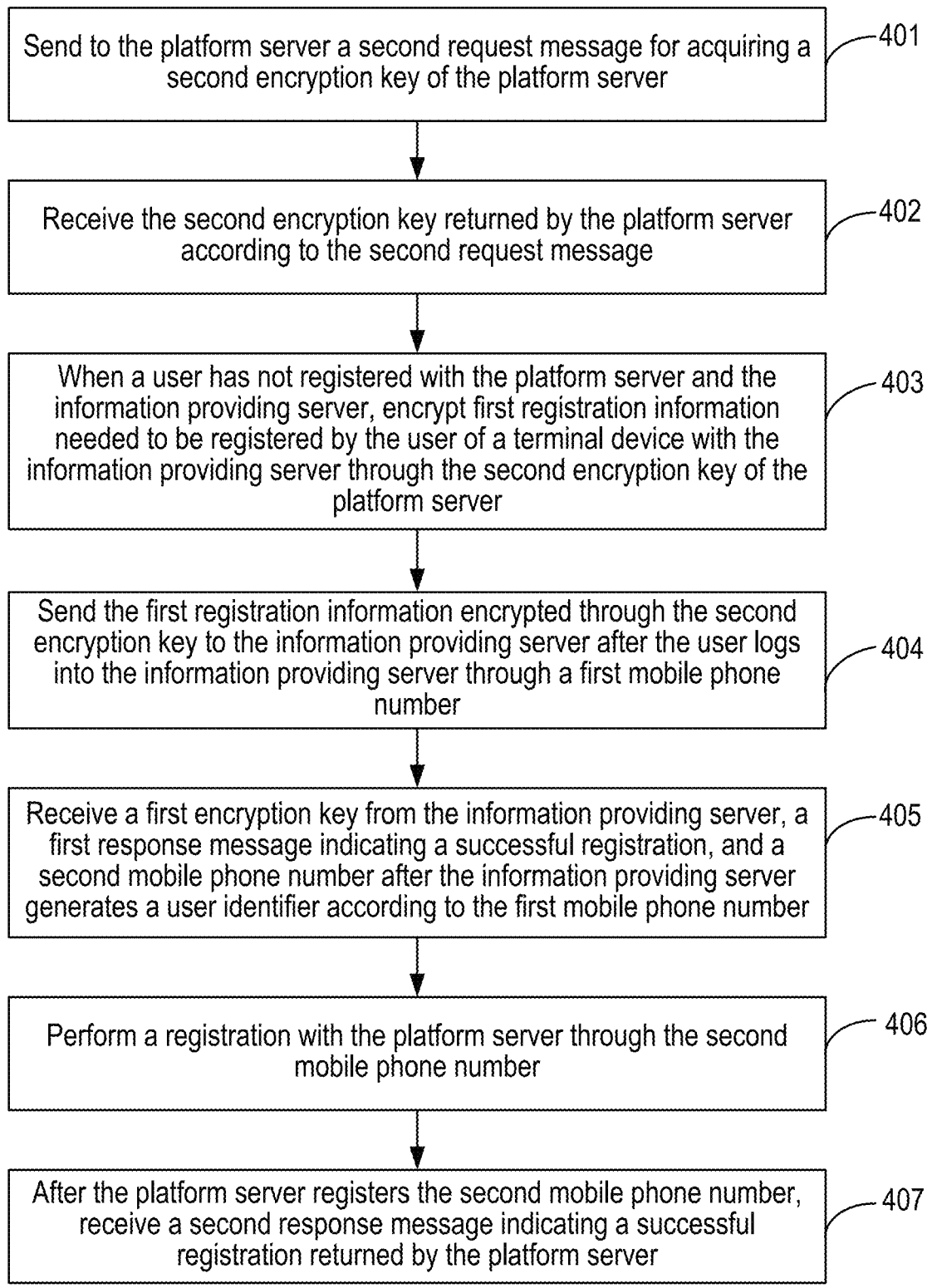
FIG. 4 is a flow diagram illustrating a method for acquiring an electronic file shown according to some embodiments of the disclosure.

FIG. 4 is a flow diagram illustrating a method for acquiring an electronic file shown according to some embodiments of the disclosure. This embodiment is exemplarily described using a user registering with a platform server and an information providing server as an example. As shown in FIG. 4, the method includes the following steps.

Step 401: Send to the platform server a second request message for acquiring a second encryption key of the platform server.

Step 402: Receive the second encryption key returned by the platform server according to the second request message.

Step 403: When a user has not registered with the platform server and the information providing server, encrypt first registration information needed to be registered by the user of a terminal device with the information providing server through the second encryption key of the platform server.

Step 404: Send the first registration information encrypted through the second encryption key to the information providing server after the user logs into the information providing server through a first mobile phone number.

Step 405: Receive a first encryption key from the information providing server, a first response message indicating a successful registration, and a second mobile phone number after the information providing server generates a user identifier according to the first mobile phone number, wherein the second mobile phone number is generated by encrypting the first mobile phone number through the first encryption key.

Step 406: Perform a registration with the platform server through the second mobile phone number.

Step 407: After the platform server registers the second mobile phone number, receive a second response message indicating a successful registration returned by the platform server.

In one embodiment of step 402, if the platform server uses a symmetric encryption algorithm, the second encryption key on the platform server may be the same as the second decryption key of the platform server. In one embodiment, the symmetric encryption algorithm may be DES, 3DES, AES, and so on. In another embodiment, if the platform server uses an asymmetric encryption algorithm, the second encryption key may be a public key of the platform server, and the second decryption key of the platform server may be a private key of the platform server. In one embodiment, the asymmetric encryption algorithm used by the platform server may be RSA, Elgamal, a knapsack algorithm, Rabin, Diffie-Hellman, ECC, and so on. In one embodiment, when the platform server needs to send the second encryption key to the information providing server, a public key of the asymmetric encryption algorithm may be used as the second encryption key. Symmetric keys may be transmitted through a secure transmission channel, or may be encrypted and then transmitted, thereby ensuring security of the symmetric keys.

In one embodiment of step 404, the terminal device sends a second mobile phone number to the platform server, and receive a third verification code returned from the information providing server. The third verification code may be sent to the terminal device by the information providing server at the request of the platform server according to the second mobile phone number. The terminal device sends the third verification code to the platform server; and a second response message indicating a successful registration returned by the platform server is received after the platform server compares the third verification code with a fourth verification code returned from the information providing server to the platform server to determine that verification is successful. Because the information providing server can decrypt the second mobile phone number according to a first decryption key thereof and assist the platform server in sending a short message verification code, it is possible to achieve the goal of secondary authentication of the user.

In this embodiment, after a platform server obtains a second mobile phone number encrypted through a first encryption key of an information providing server, the platform server cannot decrypt the second mobile phone number to acquire a cleartext mobile phone number due to the lack of a corresponding decryption key. As a result, even if the second mobile phone number is stolen on the platform server, a thief cannot decrypt the second mobile phone number due to the lack of the decryption key in the case when the thief does not acquire a first decryption key of the information providing server. Meanwhile, private data registered by a user with the information providing server is encrypted through a second encryption key of the platform server. The information providing server therefore cannot decrypt data stored on the platform server. Because it is quite unlikely that the thief hacks into both the platform server and the information providing server at the same time, the disclosure can greatly improve the security protection of the platform server and the information providing server to a great extent.

Figure 5:
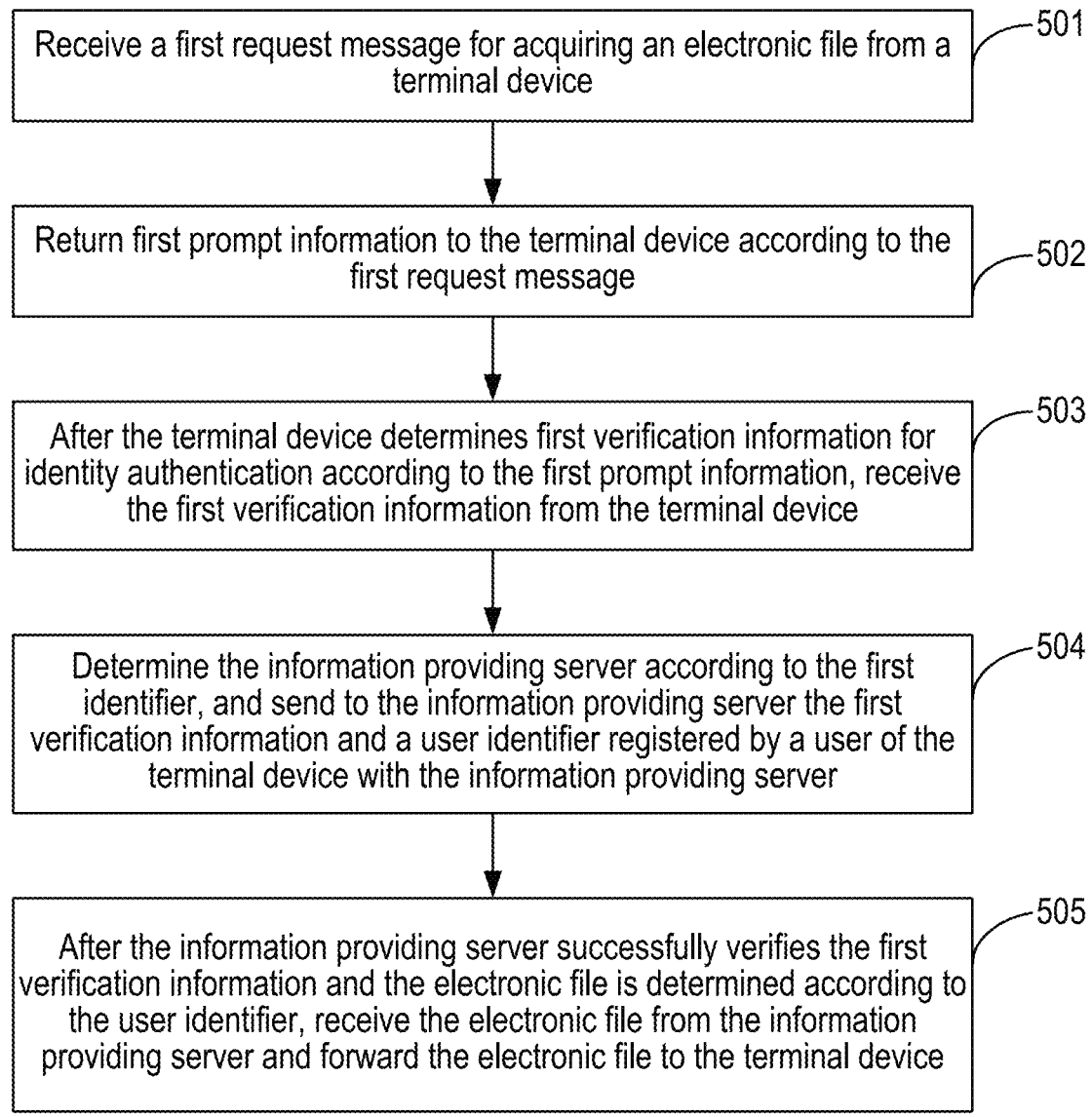
FIG. 5 is a flow diagram illustrating a method for acquiring an electronic file shown according to some embodiments of the disclosure.

FIG. 5 is a flow diagram illustrating a method for acquiring an electronic file shown according to some embodiments of the disclosure. This embodiment may be applied to a platform server. In one embodiment, the platform server may be a service of an e-commerce platform. As shown in FIG. 5, the method includes the following steps.

Step 501: Receive a first request message for acquiring an electronic file from a terminal device, wherein the first request message carries a first identifier of an information providing server providing the electronic file.

Step 502: Return first prompt information to the terminal device according to the first request message.

Step 503: After the terminal device determines first verification information for identity authentication according to the first prompt information, receive the first verification information from the terminal device.

Step 504: Determine the information providing server according to the first identifier, and send to the information providing server the first verification information and a user identifier registered by a user of the terminal device with the information providing server.

Step 505: After the information providing server successfully verifies the first verification information and the electronic file is determined according to the user identifier, receive the electronic file from the information providing server and forward the electronic file to the terminal device, wherein private information in the electronic file is encrypted through a first encryption key of the information providing server.

Reference for the description about the first request message and the electronic file in step 501 can be made by referring to the relevant description in step 101. Details will not be described herein again.

Reference for the relevant description of the first verification information and first original verification information in steps 502 and 503 can be made by referring to the relevant description in step 102 and step 103. Details will not be described herein again.

In one embodiment of step 504, the platform server may serve as an intermediary platform to provide electronic file forwarding and user identity authentication for different terminal devices and different information providing servers. When the platform server obtains the first identifier by parsing the first request message, the corresponding information providing server is determined according to the first identifier. The first verification information and a user identifier registered by a user of the terminal device with the information providing server are sent to the information providing server, so that the information providing server can verify the first verification information, and determine the electronic file that the user needs to view according to the user identifier after a successful verification.

Reference for the relevant description of the private information in the electronic file in step 505 can be made by referring to the relevant description in step 104. Details will not be described herein again.

In this embodiment, after receiving first verification information and a first request message from a terminal device, a platform server determines an information providing server according to a first identifier, and sends the first verification information and a user identifier to the information providing server. The information providing server will then be able to determine an electronic file corresponding to the user identifier, wherein private information in the electronic file is encrypted and protected through a first encryption key of the information providing server. Because the platform server does not have a first decryption key of the information providing server, a thief cannot obtain cleartext private information of a user through the electronic file even if the electronic file is stolen on the platform server side. A manager on the platform server side cannot acquire the cleartext private information of the user through the electronic file either, thereby effectively protecting the private information of the user from being leaked by the platform server and ensuring privacy security of the user.

Figure 6:
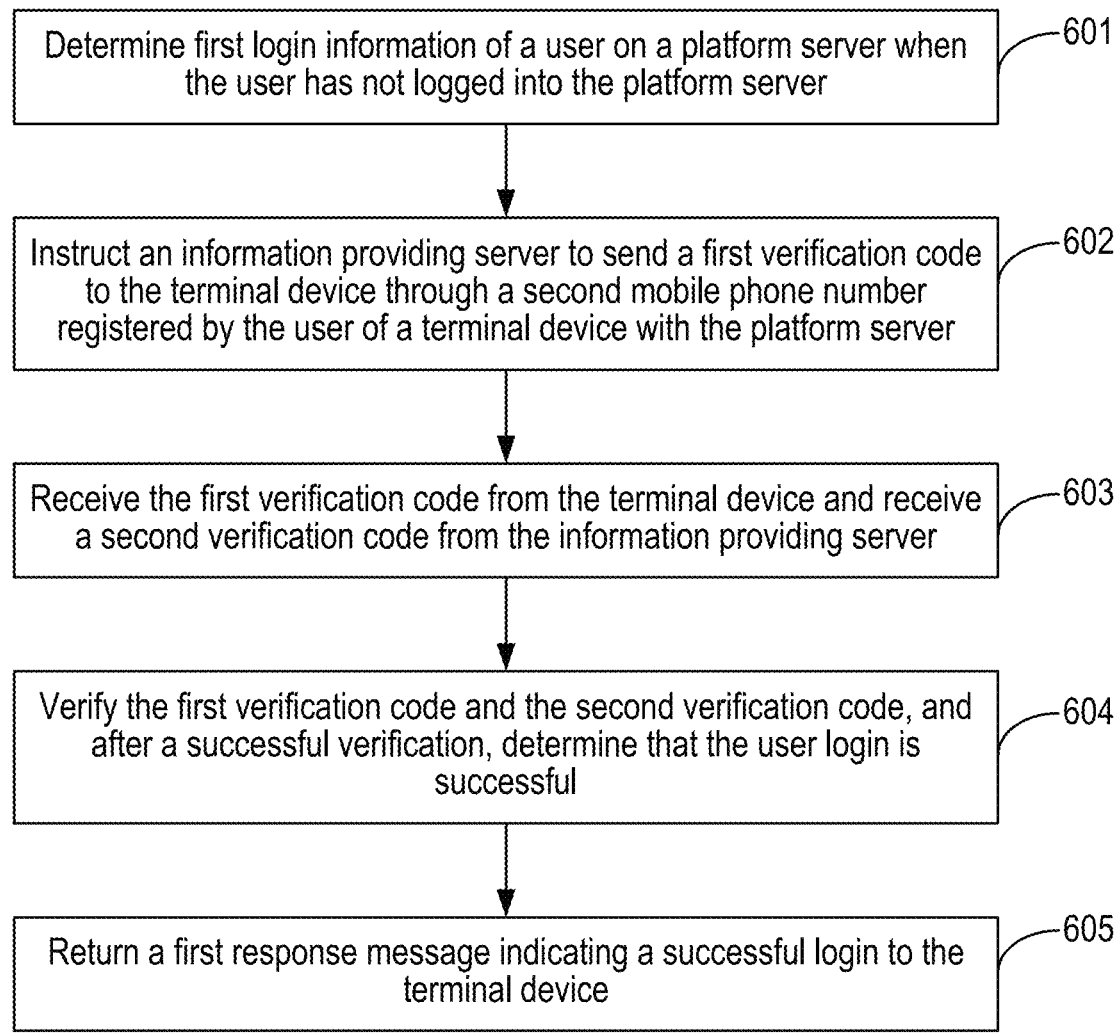
FIG. 6 is a flow diagram illustrating a method for acquiring an electronic file shown according to some embodiments of the disclosure.

FIG. 6 is a flow diagram illustrating a method for acquiring an electronic file shown according to some embodiments of the disclosure. This embodiment is exemplarily described using a user needing to log into a platform server through a terminal device as an example. As shown in FIG. 6, the method includes the following steps.

Step 601: Determine first login information of a user on the platform server when the user has not logged into the platform server.

Step 602: Instruct an information providing server to send a first verification code to the terminal device through a second mobile phone number registered by the user of a terminal device with the platform server, wherein the second mobile phone number is obtained by encrypting a first mobile phone number through a first encryption key, and the first mobile phone number is a number registered by the user with the information providing server.

Step 603: After the information providing server decrypts the second mobile phone number through a first decryption key of the information providing server to obtain the first mobile phone number, and sends the first verification code to the terminal device through the first mobile phone number, receive the first verification code from the terminal device and receive a second verification code from the information providing server.

Step 604: Verify the first verification code and the second verification code, and after a successful verification, determine that the user login is successful.

Step 605: Return a first response message indicating a successful login to the terminal device.

Reference for the description of the first login information in step 601 may be made by referring to the relevant description in step 201. Details will not be described herein again.

In steps 602, 603, and 604, the information providing server may send a second verification code to the platform server when sending a first verification code to the terminal device; so when verifying the first verification code, the platform server may compare the first verification code with the second verification code to see whether they have the same content. If so, the verification is successful, and it is determined that the user login is successful.

In this embodiment, when a user needs to log into a platform server, since the user logs into the platform server through encrypted first login information, when data on the platform server is leaked, the first login information stolen by a thief from the platform server is encrypted data. The thief therefore cannot log into the platform server through the login information obtained from the platform server, thereby effectively preventing the thief from illegally logging into the platform server through the login information stolen from the platform server and ensuring security of login information of the user. A first verification code is compared with a second verification code, thereby achieving the goal of secondary identity authentication of the user and improving the security of the user in the process of logging into the platform server.

Figure 7:
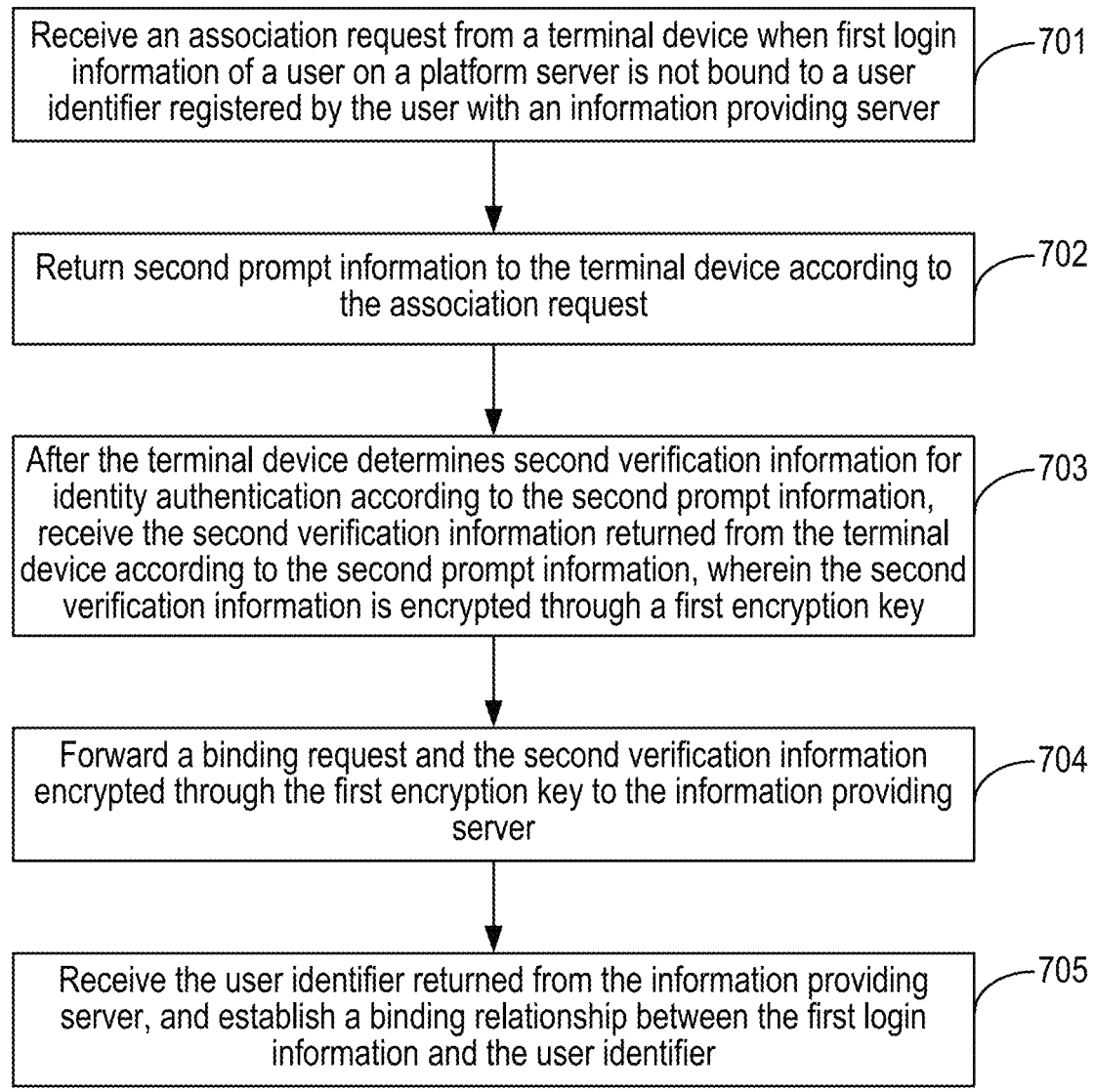
FIG. 7 is a flow diagram illustrating a method for acquiring an electronic file shown according to some embodiments of the disclosure.

FIG. 7 is a flow diagram illustrating a method for acquiring an electronic file shown according to some embodiments of the disclosure. This embodiment is exemplarily described using a user needing to bind first login information of the user on a platform server to a user identifier of the user generated on an information providing server as an example. As shown in FIG. 7, the method includes the following steps.

Step 701: Receive an association request from a terminal device when first login information of a user on the platform server is not bound to a user identifier registered by the user with the information providing server, wherein the association request carries a first identifier.

Step 702: Return second prompt information to the terminal device according to the association request.

Step 703: After the terminal device determines second verification information for identity authentication according to the second prompt information, receive the second verification information returned from the terminal device according to the second prompt information, wherein the second verification information is encrypted through a first encryption key.

Step 704: Forward a binding request and the second verification information encrypted through the first encryption key to the information providing server, so that the information providing server decrypts the second verification information encrypted through the first encryption key, and determines the user identifier registered by the user with the information providing server according to the decrypted second verification information.

Step 705: Receive the user identifier returned from the information providing server, and establish a binding relationship between the first login information and the user identifier.

This embodiment is described using the platform server being an EPP and the information providing server being an HIS as an example. A terminal device logs into the EPP through a second mobile phone number, wherein the second mobile phone number is obtained by encrypting an original first mobile phone number through a first encryption key of the HIS information providing server. The EPP receives an association request from the terminal device, wherein the association request carries HIS_ID, and after receiving second verification information from the terminal device, the EPP sends to the HIS the second mobile phone number, the second verification information, and a second encryption key of the EPP, and requests the HIS to verify the second verification information. The HIS returns a user identifier to the EPP after the verification on the second verification information is successful. The EPP stores the second verification information and stores an association between the second mobile phone and the user identifier. In one embodiment, the HIS may generate the user identifier through the first mobile phone number.

In this embodiment, an information providing server verifies second verification information from a platform server to assist the platform server in achieving the goal of secondary identity authentication; on the platform server, since the second verification information is generated by encrypting second original verification information through a first encryption key of the information providing server, the platform server cannot acquire cleartext verification information of a user of a terminal device, so as to prevent a data thief from stealing the verification information of the user of the terminal device, and prevent an invalid user from binding first login information of a valid user on the platform server to a user identifier of the user on the information providing server through an invalid association request to the platform server.

Figure 8:
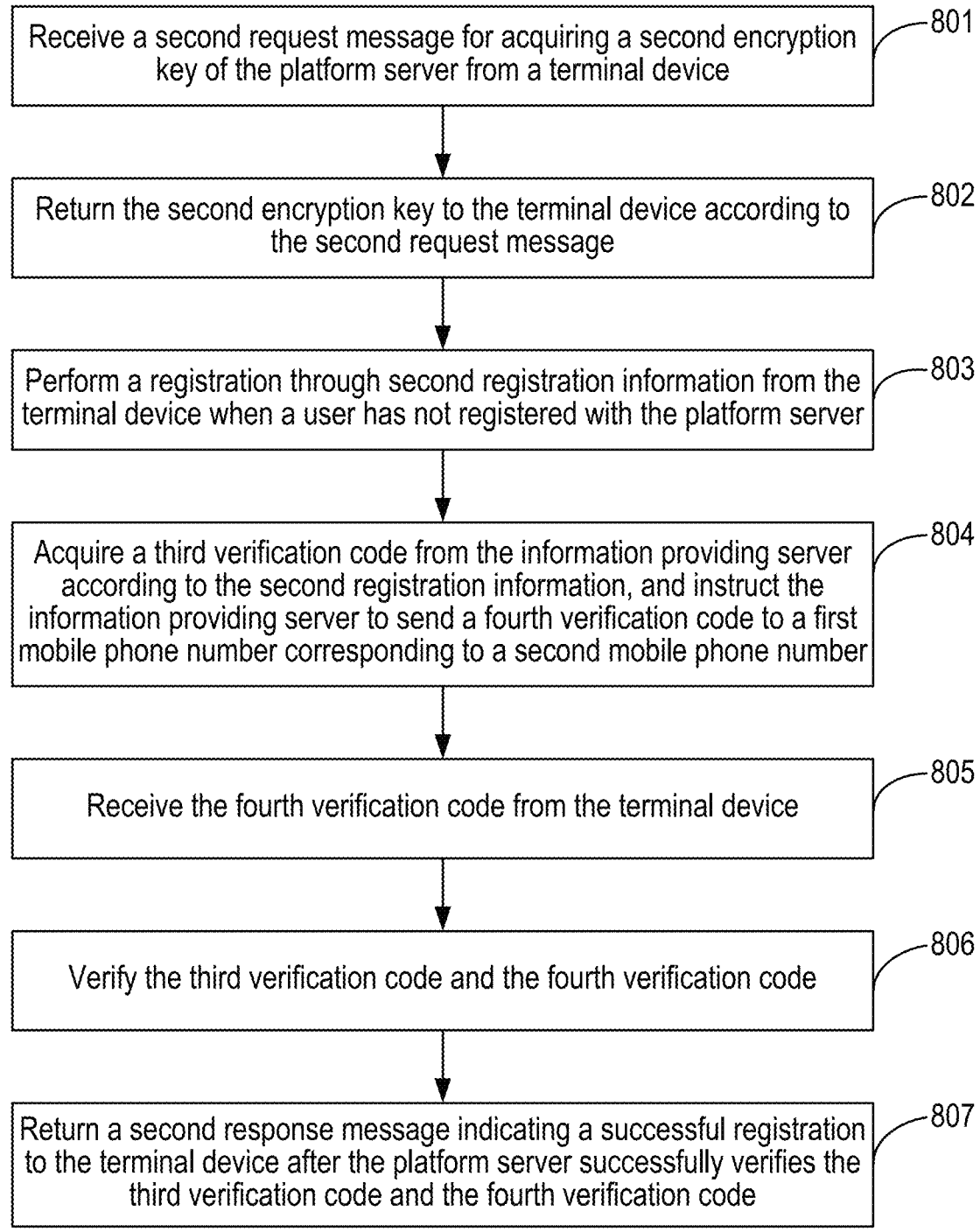
FIG. 8 is a flow diagram illustrating a method for acquiring an electronic file shown according to some embodiments of the disclosure.

FIG. 8 is a flow diagram illustrating a method for acquiring an electronic file shown according to some embodiments of the disclosure. This embodiment is exemplarily described using a user registering with a platform server and an information providing server as an example. As shown in FIG. 8, the method includes the following steps.

Step 801: Receive a second request message for acquiring a second encryption key of the platform server from a terminal device.

Step 802: Return the second encryption key to the terminal device according to the second request message.

Step 803: Perform a registration through second registration information from the terminal device when a user has not registered with the platform server.

Step 804: Acquire a third verification code from the information providing server according to the second registration information, and instruct the information providing server to send a fourth verification code to a first mobile phone number corresponding to a second mobile phone number.

Step 805: Receive the fourth verification code from the terminal device.

Step 806: Verify the third verification code and the fourth verification code.

Step 807: Return a second response message indicating a successful registration to the terminal device after the platform server successfully verifies the third verification code and the fourth verification code.

In this embodiment, after a platform server obtains a second mobile phone number encrypted through a first encryption key of an information providing server, the platform server cannot decrypt the second mobile phone number to acquire a cleartext mobile phone number due to the lack of a corresponding decryption key. As a result, even if the second mobile phone number is stolen on the platform server, a thief cannot decrypt the second mobile phone number due to the lack of the decryption key in the case when the thief does not acquire a first decryption key of the information providing server. Meanwhile, private data registered by a user with the information providing server is encrypted through a second encryption key of the platform server, so the information providing server cannot decrypt data stored on the platform server, Because it is quite unlikely for the thief to hack into both the platform server and the information providing server at the same time, the disclosure can greatly improve the security protection of the platform server and the information providing server to a great extent.

Figure 9:
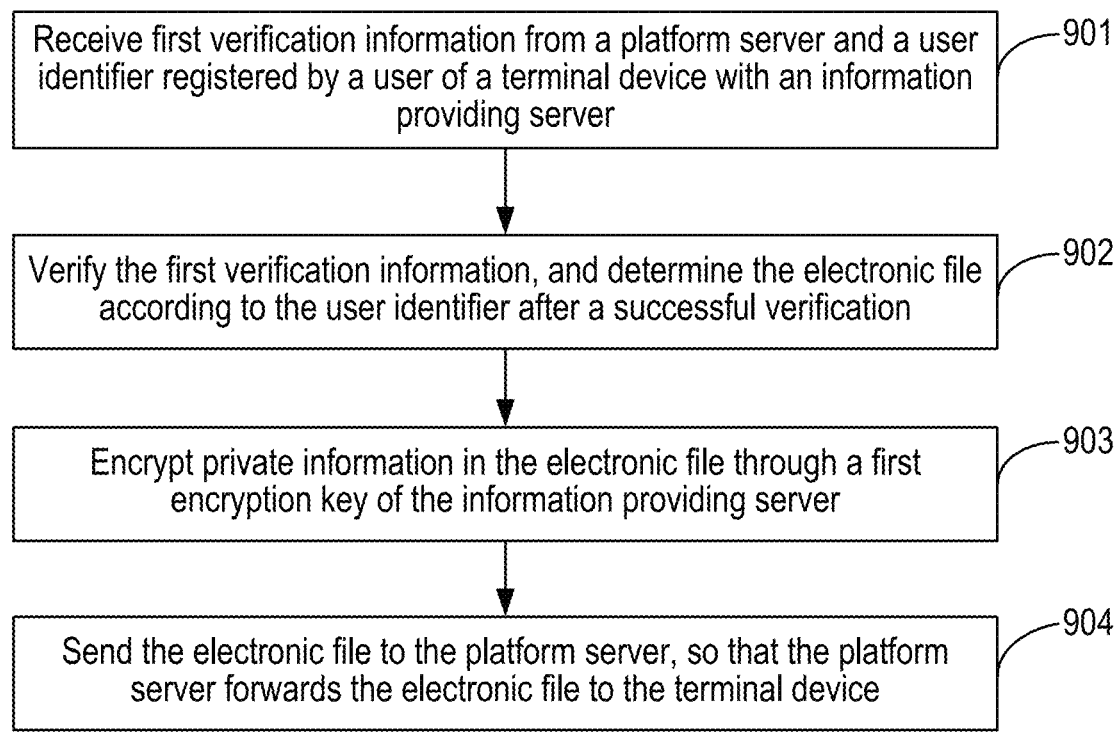
FIG. 9 is a flow diagram illustrating a method for acquiring an electronic file shown according to some embodiments of the disclosure.

FIG. 9 is a flow diagram illustrating a method for acquiring an electronic file shown according to some embodiments of the disclosure. This embodiment may be applied to an information providing server. In one embodiment, the information providing server may be a server of a hospital system, and an electronic prescription may be provided to a user of a terminal device through the information providing server. As shown in FIG. 9, the method includes the following steps.

Step 901: Receive first verification information from a platform server and a user identifier registered by a user of a terminal device with the information providing server.

Step 902: Verify the first verification information, and determine the electronic file according to the user identifier after a successful verification.

Step 903: Encrypt private information in the electronic file through a first encryption key of the information providing server.

Step 904: Send the electronic file to the platform server, so that the platform server forwards the electronic file to the terminal device.

In step 902, the information providing server may decrypt the first verification information through a first decryption key of the information providing server, and encrypt the decrypted first verification information through a second encryption key of the platform server to obtain a first encrypted character string; a second encrypted character string generated when the user registers with the information providing server is determined, wherein the second encrypted character string is generated by encrypting the first verification information through the second encryption key of the platform server; and it is determined whether the first encrypted character string and the second encrypted character string are the same, and if so, verification on the first verification information is successful.

In this embodiment, after an information providing server verifies first verification information from a platform server and the verification is successful, an electronic file is determined according to a user identifier from the platform server, and private information in the electronic file is encrypted through a first encryption key. Because the platform server does not have the first encryption key of the information providing server, a thief cannot obtain cleartext private information of a user through the electronic file even if the electronic file is stolen on the platform server side. A manager on the platform server side cannot acquire the cleartext private information of the user through the electronic file either, thereby effectively protecting the private information of the user from being leaked by the platform server and ensuring privacy security of the user.

Figure 10:
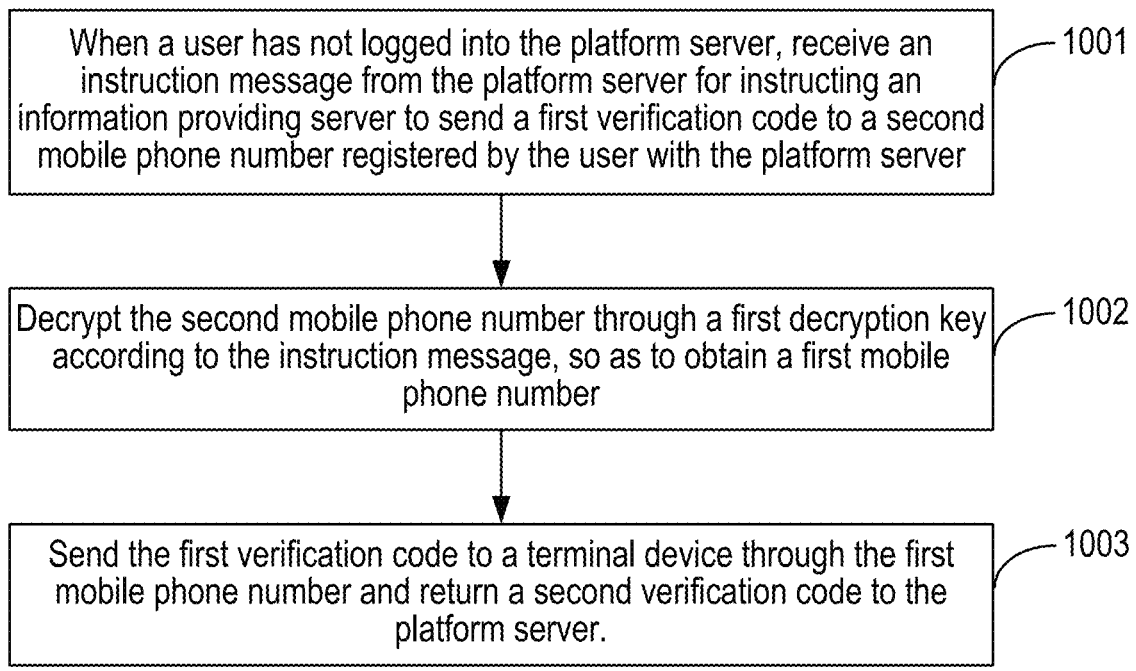
FIG. 10 is a flow diagram illustrating a method for acquiring an electronic file shown according to some embodiments of the disclosure.

FIG. 10 is a flow diagram illustrating a method for acquiring an electronic file shown according to some embodiments of the disclosure. This embodiment is exemplarily described using a user needing to log into a platform server through a terminal device as an example. As shown in FIG. 10, the method includes the following steps.

Step 1001: When a user has not logged into the platform server, receive an instruction message from the platform server for instructing an information providing server to send a first verification code to a second mobile phone number registered by the user with the platform server, wherein the second mobile phone number is obtained by encrypting a first mobile phone number through a first encryption key, and the first mobile phone number is a number registered by the user with the information providing server.

Step 1002: Decrypt the second mobile phone number through a first decryption key according to the instruction message, so as to obtain the first mobile phone number.

Step 1003: Send the first verification code to the terminal device through the first mobile phone number and return a second verification code to the platform server, so that the platform server performs a login verification on the user according to the first verification code and the second verification code.

In this embodiment, when a user needs to log into a platform server, an information providing server decrypts a second mobile phone number through a first decryption key according to an instruction message from the platform server to obtain a first mobile phone number; and sends a first verification code to a terminal device through the first mobile phone number and returns a second verification code to the platform server, so as to assist the platform server in performing secondary identity authentication on the user, thereby improving the security of the user in the process of logging into the platform server.

Figure 11:
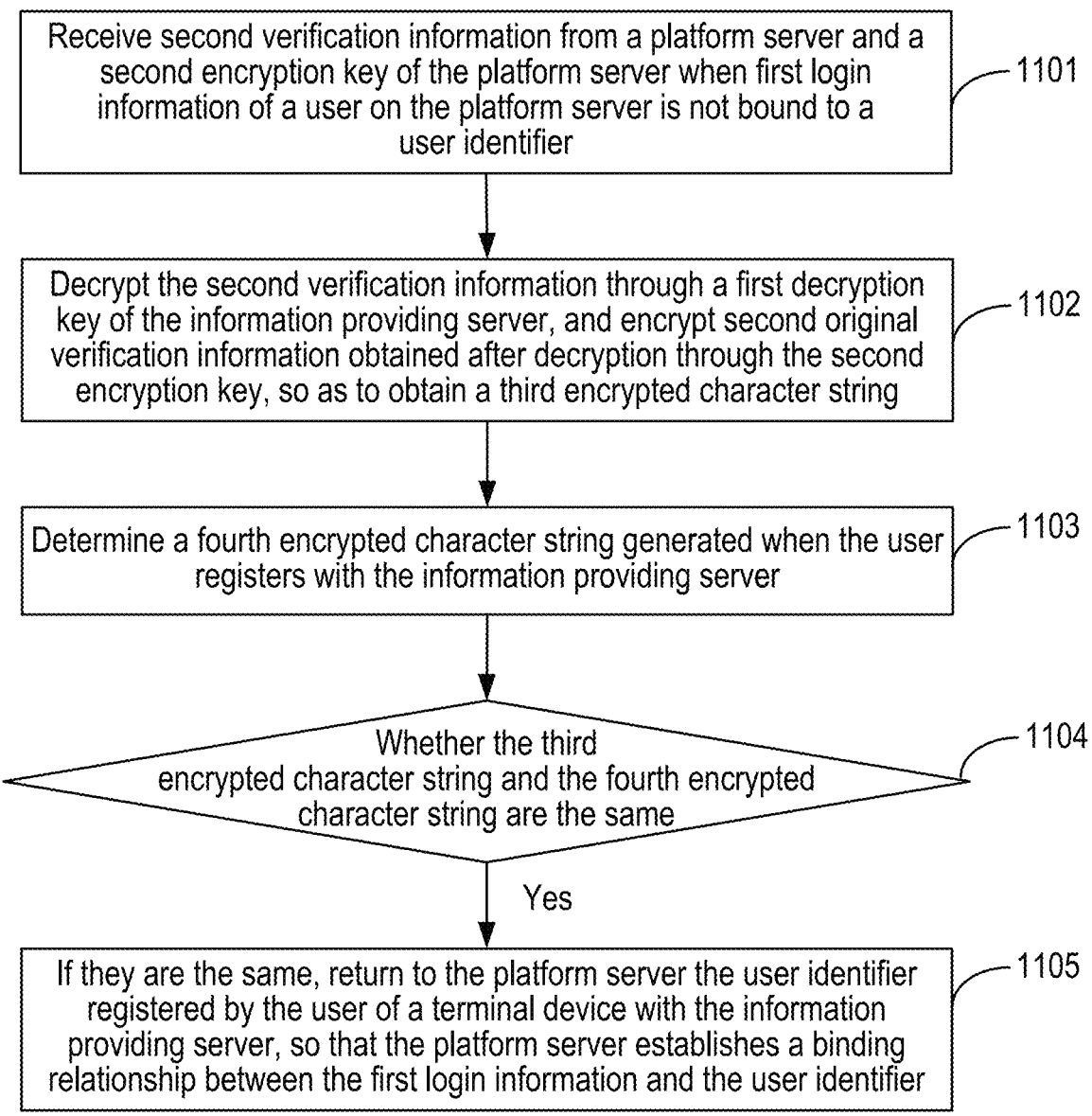
FIG. 11 is a flow diagram illustrating a method for acquiring an electronic file shown according to some embodiments of the disclosure.

FIG. 11 is a flow diagram illustrating a method for acquiring an electronic file shown according to some embodiments of the disclosure. This embodiment is exemplarily described using a user needing to bind first login information of the user on a platform server to a user identifier of the user generated on an information providing server as an example. As shown in FIG. 11, the method includes the following steps.

Step 1101: Receive second verification information from the platform server and a second encryption key of the platform server when first login information of a user on the platform server is not bound to a user identifier, wherein the second verification information is encrypted through a first encryption key.

Step 1102: Decrypt the second verification information through a first decryption key of the information providing server, and encrypt second original verification information obtained after decryption through the second encryption key, so as to obtain a third encrypted character string.

Step 1103: Determine a fourth encrypted character string generated when the user registers with the information providing server, wherein the fourth encrypted character string is generated by encrypting the second original verification information through the second encryption key of the platform server.

Step 1104: Determine whether the third encrypted character string and the fourth encrypted character string are the same.

Step 1105: If they are the same, return to the platform server the user identifier registered by the user of a terminal device with the information providing server, so that the platform server establishes a binding relationship between the first login information and the user identifier.

As an exemplary scenario, second verification information from the platform server received by the information providing server is a character string "AAAA&&&" and a second encryption key of the platform server is "121212". Because "AAAA&&&" is encrypted through a first encryption key, cleartext verification information "BBBB&&&" is generated after the information providing server decrypts "AAAA&&&" through a first decryption key thereof; "BBBB&&&" is encrypted through the second encryption key "121212" to obtain a third encrypted character string "CCCC&&&"; a fourth encrypted character string "DDDD&&&" generated when the user registers with the information providing server is determined; and the fourth encrypted character string is generated by encrypting the second verification information AAAA&&& through the second encryption key "121212" of the platform server. It can be seen that the third encrypted character string "CCCC&&&" and the fourth encrypted character string "DDDD&&&" should be character strings having the same content; and if they have different content, it indicates that an association request of the user is invalid or an invalid user requests association.

In this embodiment, an information providing server verifies second verification information from a platform server by encrypting a character string to assist the platform server in achieving the goal of secondary identity authentication. On the platform server, since the second verification information is generated by encrypting second original verification information through a first encryption key of the information providing server, the platform server cannot acquire cleartext verification information of a user of a terminal device. Moreover, a fourth encrypted character string is generated by encrypting the second verification information through a second encryption key of the platform server, so the information providing server side can obtain cleartext verification information only when verifying the user, so as to prevent a data thief from stealing the verification information of the user of the terminal device on the platform server and the information providing server. The design also prevents an invalid user from binding first login information of a valid user on the platform server to a user identifier of the user on the information providing server through an invalid association request to the platform server.

Figure 12:
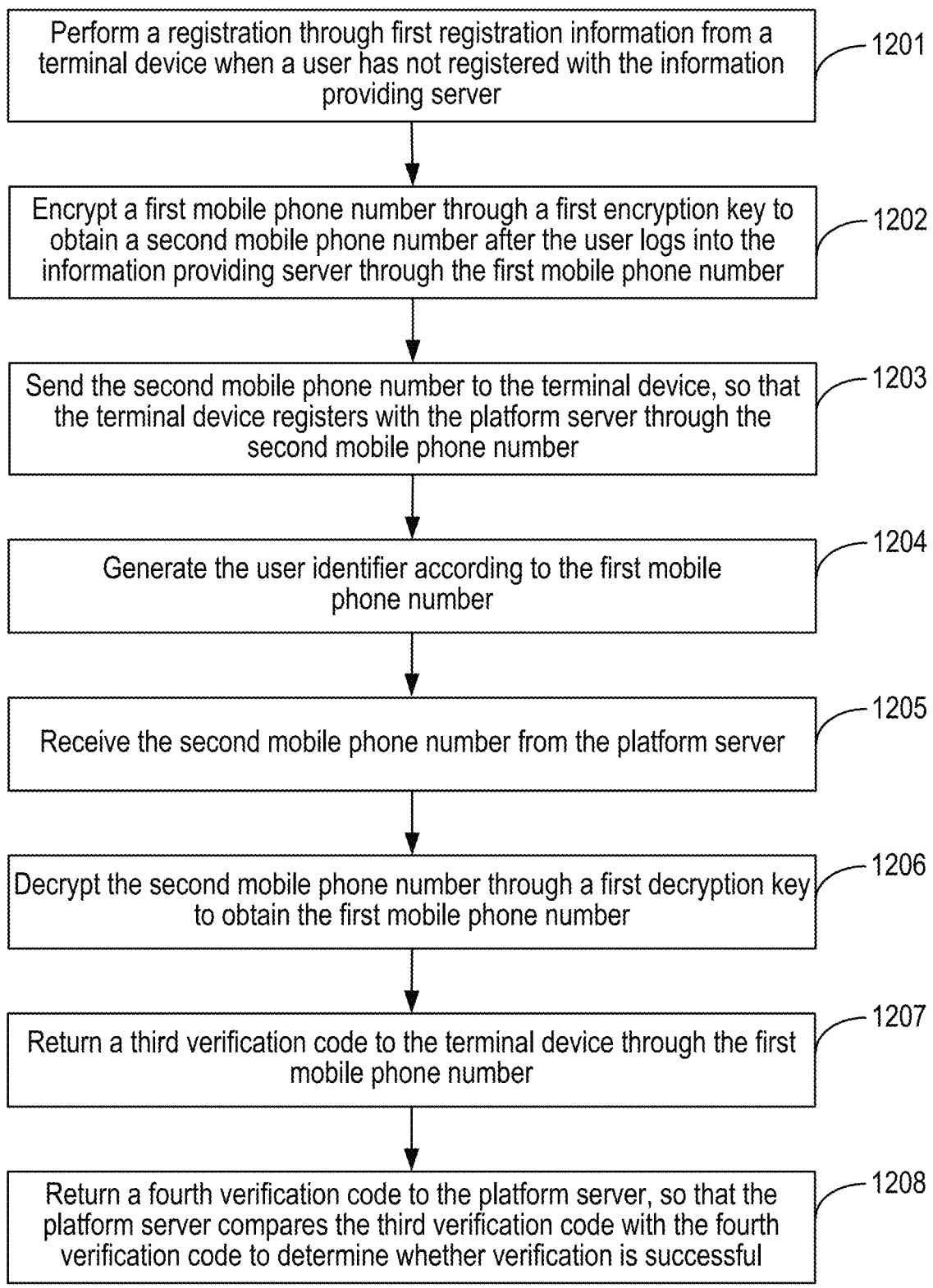
FIG. 12 is a flow diagram illustrating a method for acquiring an electronic file shown according to some embodiments of the disclosure.

FIG. 12 is a flow diagram illustrating a method for acquiring an electronic file shown according to some embodiments of the disclosure. This embodiment is exemplarily described using a user registering with a platform server and an information providing server as an example. As shown in FIG. 12, the method includes the following steps.

Step 1201: Perform a registration through first registration information from a terminal device when a user has not registered with the information providing server.

Step 1202: Encrypt a first mobile phone number through a first encryption key to obtain a second mobile phone number after the user logs into the information providing server through the first mobile phone number.

Step 1203: Send the second mobile phone number to the terminal device, so that the terminal device registers with the platform server through the second mobile phone number.

Step 1204: Generate a user identifier according to the first mobile phone number.

Step 1205: Receive the second mobile phone number from the platform server.

Step 1206: Decrypt the second mobile phone number through a first decryption key to obtain the first mobile phone number.

Step 1207: Return a third verification code to the terminal device through the first mobile phone number, wherein the third verification code is sent to the terminal device by the information providing server at the request of the platform server according to second registration information.

Step 1208: Return a fourth verification code to the platform server, so that the platform server compares the third verification code with the fourth verification code to determine whether verification is successful.

In this embodiment, after a platform server obtains a second mobile phone number encrypted through a first encryption key of an information providing server, the platform server cannot decrypt the second mobile phone number to acquire a cleartext mobile phone number due to the lack of a corresponding decryption key. As a result, even if the second mobile phone number is stolen on the platform server, a thief cannot decrypt the second mobile phone number due to the lack of the decryption key in the case when the thief does not acquire a first decryption key of the information providing server. Meanwhile, private data registered by a user on the information providing server is encrypted through a second encryption key of the platform server, so the information providing server cannot decrypt data stored on the platform server. Because it is quite unlikely for the thief to hack into both the platform server and the information providing server at the same time, the disclosure can greatly improve the degree of security protection of the platform server and the information providing server.

Figure 13:
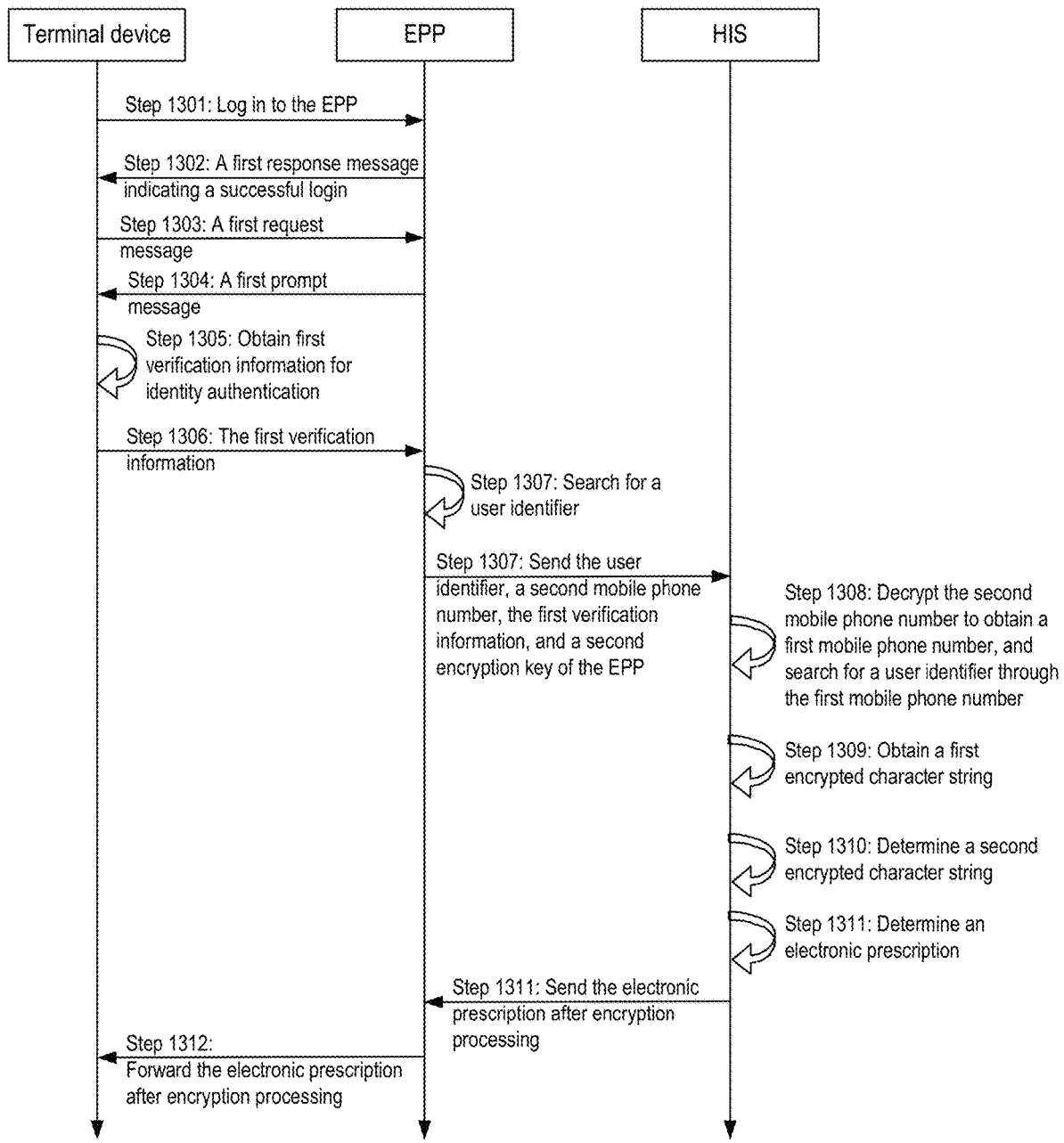
FIG. 13 is an activity diagram illustrating a method for acquiring an electronic file shown according to some embodiments of the disclosure.

FIG. 13 is an activity diagram illustrating a method for acquiring an electronic file shown according to some embodiments of the disclosure. This embodiment uses an electronic file being an electronic prescription, a platform server being an EPP, and an information providing server being an HIS as an example to describe how a user acquires an electronic prescription from the HIS. The HIS and the EPP both use an asymmetric encryption algorithm. Correspondingly, a public key on the HIS side is a first encryption key; a private key on the HIS side is a first decryption key; a public key on the EPP side is a second encryption key; and a private key on the EPP side is a second decryption key. As shown in FIG. 13, the method includes the following steps.

Step 1301: A patient logs into the EPP through a terminal device through a login name and a login password that are encrypted through a public key of the HIS, wherein the login manner may be login through a pattern, or may be login by inputting a login name and password.

Step 1302: The EPP returns a first response message indicating a successful login to the terminal device.

Step 1303: The terminal device sends a first request message for acquiring an electronic prescription to the EPP to request viewing of an electronic prescription of the patient in a specified hospital, wherein the first request message carries a hospital identifier HIS_ID (which may also be referred to as a first identifier).

Step 1304: The EPP returns a first prompt message to the terminal device according to the first request message, so as to prompt the user to input first verification information.

Step 1305: The terminal device determines, according to the first prompt information, first original verification information input by the user at the terminal device and determines a first encryption key of the information providing server, and encrypts the first original verification information according to the first encryption key to obtain the first verification information for identity authentication.

Step 1306: Send the first verification information to the EPP.

Step 1307: The EPP finds a user identifier (PatientID) of the patient in the specified hospital through the login name of the patient, and sends the user identifier, a second mobile phone number, the first verification information, and a second encryption key of the EPP to the HIS.

Step 1308: The HIS decrypts the second mobile phone number through a first decryption key thereof to obtain a first mobile phone number, and searches for a user identifier of the patient on the HIS through the first mobile phone number.

Step 1309: The HIS decrypts the first verification information through the first decryption key of the HIS, and encrypts the decrypted first verification information through the second encryption key of the EPP to obtain a first encrypted character string.

Step 1310: The HIS determines a second encrypted character string generated when the patient registers with the HIS, wherein the second encrypted character string is generated by encrypting the first verification information through the second encryption key of the EPP, and the HIS compares the first encrypted character string with the second encrypted character string to see whether they are the same; if so, verification on the first verification information is successful.

Step 1311: The HIS determines the electronic prescription, encrypts private information in the electronic prescription through the first encryption key, and sends the encrypted electronic prescription to the EPP.

Step 1312: The EPP returns the electronic prescription to the terminal device.

In this embodiment, since an electronic prescription to be viewed by a patient is a diagnosis and treatment record of the patient, a recipe, instructions for taking the medicine, and so on, performing privacy protection on private information in the electronic prescription through a first encryption key of an HIS does not affect the patient's user experience. Since the HIS encrypts only the private information in the electronic prescription through the first encryption key, and does not encrypt non-private information, the computational complexity of the HIS side can be lowered.

Figure 14:
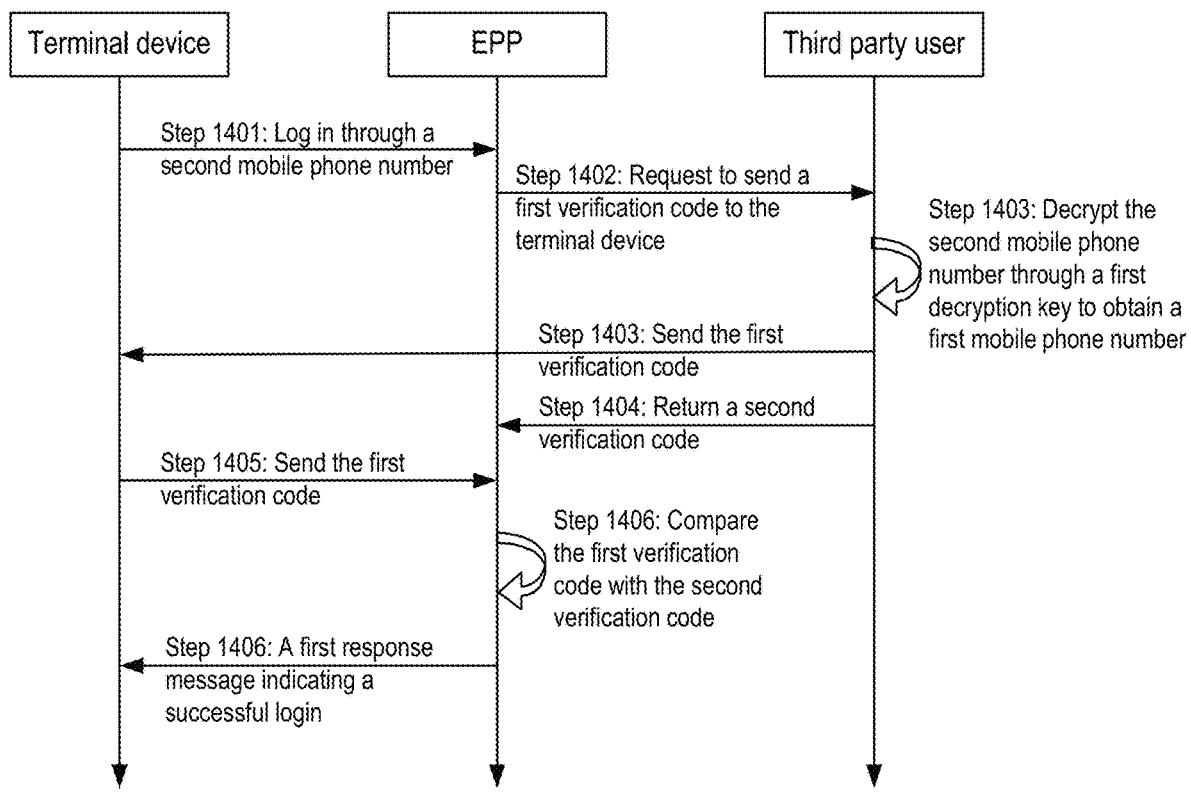
FIG. 14 is an activity diagram illustrating a method for acquiring an electronic file shown according to some embodiments of the disclosure.

FIG. 14 is an activity diagram illustrating a method for acquiring an electronic file shown according to some embodiments of the disclosure. This embodiment uses an electronic file being an electronic prescription, a platform server being an EPP, and an information providing server being an HIS as an example to describe how a user logs into the EPP through a second mobile phone number. As shown in FIG. 14, the method includes the following steps.

Step 1401: When a patient initiates a login request to the EPP through a terminal device, the terminal device encrypts a cleartext mobile phone number of the user through a first encryption key of the HIS to obtain a second mobile phone number, and logs in through the second mobile phone number.

Step 1402: The EPP requests, based on the second mobile phone number, the HIS to send a first verification code to the terminal device.

Step 1403: The HIS decrypts the second mobile phone number through a corresponding first decryption key thereof based on the second mobile phone number to obtain a first mobile phone number, and sends the first verification code to the terminal device through the first mobile phone number.

Step 1404: The HIS returns a second verification code to the EPP.

Step 1405: The EPP receives the first verification code from the terminal device.

Step 1406: The EPP compares the first verification code with the second verification code, and when determining that they are the same, the EPP determines that the patient logs in successfully, and returns a first response message indicating a successful login to the terminal device.

In this embodiment, when a user needs to log into an EPP, cleartext login information of the user is encrypted through a first encryption key; and the platform server is being logged into through encrypted first login information. When data on the platform server is leaked, the first login information stolen from the platform server by a thief is encrypted data. The thief therefore cannot log into the platform server through the login information obtained from the platform server, thereby effectively preventing the thief from illegally logging into the platform server through the stolen login information from the platform server and ensuring security of login information of the user. An HIS decrypts a second mobile phone number through a first decryption key thereof to obtain a first mobile phone number, and sends a first verification code and a second verification code to a terminal device and the EPP respectively, so as to assist the EPP in completing secondary identity authentication.

Figure 15:
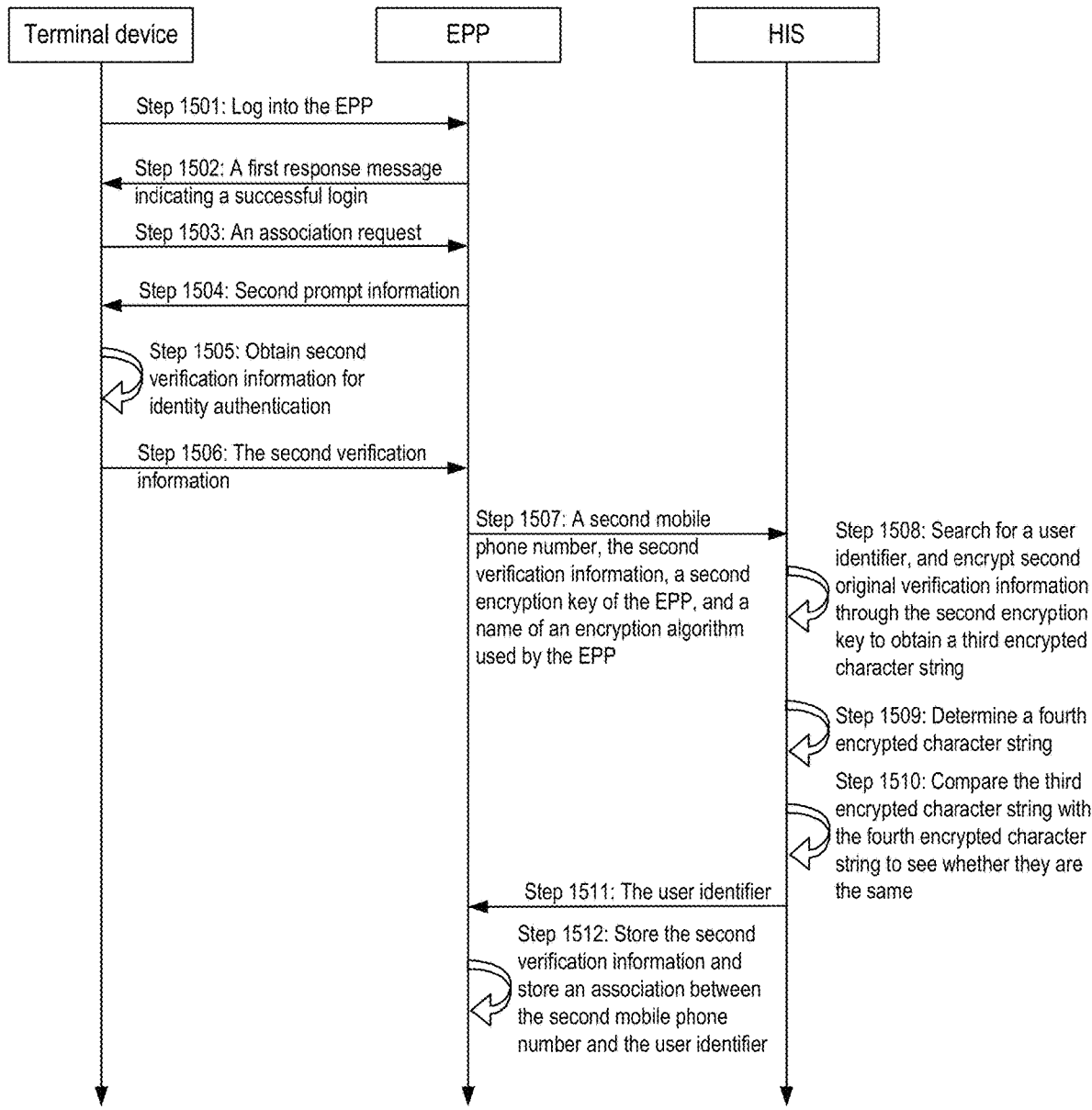
FIG. 15 is an activity diagram illustrating a method for acquiring an electronic file shown according to some embodiments of the disclosure.

FIG. 15 is an activity diagram illustrating a method for acquiring an electronic file shown according to some embodiments of the disclosure. This embodiment uses an electronic file being an electronic prescription, a platform server being an EPP, and an information providing server being an HIS as an example to describe how to bind a login name in first login information of a user on the EPP to a user identifier of the user on the HIS. As shown in FIG. 15, the method includes the following steps.

Step 1501: A terminal device logs into the EPP through a second mobile phone number (that is, obtained by encrypting an original first mobile phone number through a first decryption key of the HIS) and a login password.

Step 1502: The EPP returns a first response message indicating a successful login to the terminal device.

Step 1503: The terminal device sends an association request to the EPP, wherein the association request carries a hospital identifier.

Step 1504: The EPP returns second prompt information to the terminal device, so as to prompt a user to input second original verification information through the terminal device.

Step 1505: The user inputs the second original verification information (for example, an identity card number) according to the second prompt information, and encrypts the second original verification information through a first encryption key of the HIS to generate second verification information.

Step 1506: The terminal device sends the second verification information to the EPP.

Step 1507: The EPP sends to the HIS the second mobile phone number, the second verification information, a second encryption key of the EPP, and a name of an encryption algorithm used by the EPP, and requests the HIS to verify the second verification information.

Step 1508: The HIS decrypts the second mobile phone number through the corresponding encryption algorithm and through the first decryption key thereof to obtain the first mobile phone number; searches for a user identifier according to the first mobile phone number; decrypts the second verification information through the first decryption key of the information providing server to obtain the second original verification information; and encrypts the second original verification information through the second encryption key to obtain a third encrypted character string.

Step 1509: Determine a fourth encrypted character string generated when the user registers with the information providing server, wherein the fourth encrypted character string is generated by encrypting the second original verification information through the second encryption key of the platform server.

Step 1510: The HIS compares the third encrypted character string with the fourth encrypted character string to see whether they are the same, so as to perform the verification.

Step 1511: If they are the same, the verification of the HIS is successful, and the user identifier is returned to the EPP.

Step 1512: The EPP stores the second verification information and stores an association between the second mobile phone number and the user identifier.

In the flow described in this embodiment, an HIS obtains second verification information from an EPP, obtains second original verification information encrypted by a first encryption key through a first decryption key of the HIS; and encrypts the second original verification information through a second encryption key of the EPP to obtain a third encrypted character string, thereby achieving the purpose of identity authentication. In the process of binding first login information to a user identifier, except a first mobile phone number for indexing and second verification information for verification, other data on the HIS side is confidential. In addition, login information of a user on the EPP platform side is also confidential, thereby achieving the purpose of privacy protection.

Figure 16:
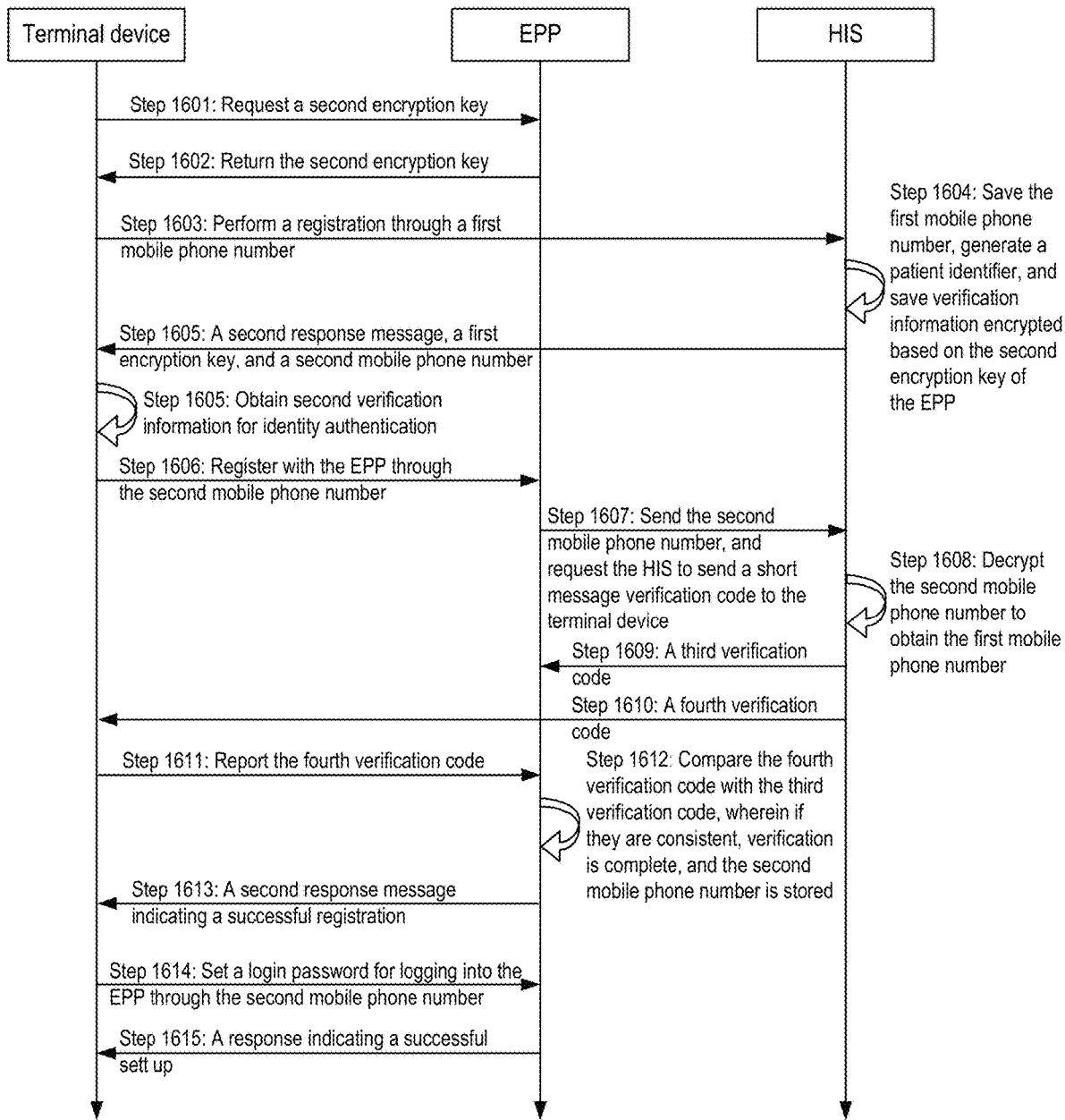
FIG. 16 is an activity diagram illustrating a method for acquiring an electronic file shown according to some embodiments of the disclosure.

FIG. 16 is an activity diagram illustrating a method for acquiring an electronic file shown according to some embodiments of the disclosure. This embodiment uses an electronic file being an electronic prescription, a platform server being an EPP, and an information providing server being an HIS as an example to describe how a user registers with the EPP and the HIS side. As shown in FIG. 16, the method includes the following steps.

Step 1601: A patient requests a second encryption key of the EPP from the EPP through a terminal device.

Step 1602: The EPP returns the second encryption key of the EPP to the terminal device and sends a digital signature to the terminal device.

Step 1603: The terminal device registers with the HIS through a first mobile phone number (that is, an original mobile phone number), and encrypts information to be registered through the second encryption key of the EPP. The information to be registered with the HIS includes: name, medical record number, identity card number, mobile phone number, home address, drug allergy record, past medical history, and so on.

Step 1604: The HIS saves the first mobile phone number, generates a patient identifier (PatientID), and saves verification information (for example, the identity card number) encrypted based on the second encryption key of the EPP.

Step 1605: The HIS returns a second response message indicating a successful registration to the terminal device, and returns to the terminal device a first encryption key of the HIS and a second mobile phone number that is generated after encrypting the first mobile phone number through the first encryption key of the HIS.

Step 1606: The terminal device registers with the EPP through the second mobile phone number.

Step 1607: The EPP sends the second mobile phone number to the HIS, and requests the HIS to send a short message verification code to the terminal device.

Step 1608: The HIS decrypts the second mobile phone number through the first encryption key of the HIS to obtain the first mobile phone number.

Step 1609: The HIS returns a third verification code to the EPP.

Step 1610: The HIS returns a fourth verification code to the terminal device based on the first mobile phone number.

Step 1611: The terminal device reports the fourth verification code to the EPP.

Step 1612: The EPP compares the fourth verification code reported by the terminal device with the third verification code returned by the HIS, and if they are consistent, verification is successful, and the second mobile phone number is stored.

Step 1613: The EPP returns a second response message indicating a successful registration to the terminal device.

Step 1614: The terminal device may set a login password for logging into the EPP through the second mobile phone number.

Step 1615: The EPP returns a response indicating a successful set up to the terminal device.

In the flow of this embodiment, after an EPP obtains a second mobile phone number encrypted through a first encryption key of an HIS; the EPP cannot decrypt the second mobile phone number to acquire a cleartext mobile phone number due to the lack of a corresponding decryption key. As a result, even if the second mobile phone number is stolen on the platform server, a thief cannot decrypt the second mobile phone number due to the lack of the decryption key in the case when the thief does not acquire a first decryption key of the HIS. Meanwhile, private data registered by a user on the HIS is encrypted through a second encryption key of the EPP, so the HIS cannot decrypt data stored on the EPP. Because it is quite unlikely for the thief to hack into both the EPP and the HIS at the same time, the disclosure can greatly improve the security protection of the EPP and the HIS to a great extent. In addition, the HIS can perform decryption according to its own first decryption key to obtain the first mobile phone number, so as to assist the EPP in sending a short message verification code to complete secondary authentication.

Figure 17:
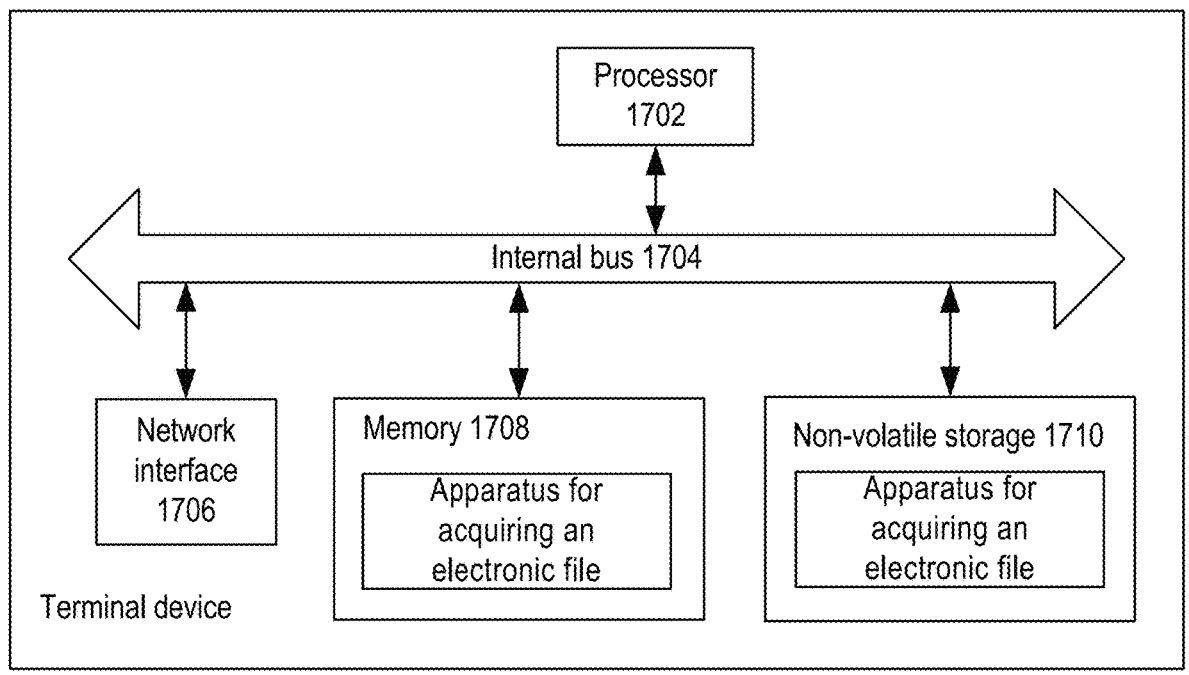
FIG. 17 is a block diagram illustrating a terminal device according to some embodiments of the disclosure.

Corresponding to the aforementioned method for acquiring an electronic file, the disclosure further provides a block diagram illustrating a terminal device according to an exemplary embodiment of the disclosure shown in FIG. 17. Please refer to FIG. 17, the terminal device includes a processor 1702, an internal bus 1704, a network interface 1706, a memory 1708, and a non-volatile storage 1710 on the hardware level, and certainly may also include hardware required by other services. The processor 1702 reads a corresponding computer program into the memory 1708 from the non-volatile storage 1710 and then runs the computer program, so as to form an apparatus for acquiring an electronic file on the logical level. In addition to the software implementation, the disclosure can certainly include other implementations, for example, using a logical device or a combination of software and hardware. That is to say, execution bodies of the following processing flows are not limited to logical units, and may also be hardware or logical devices.

Figure 18:
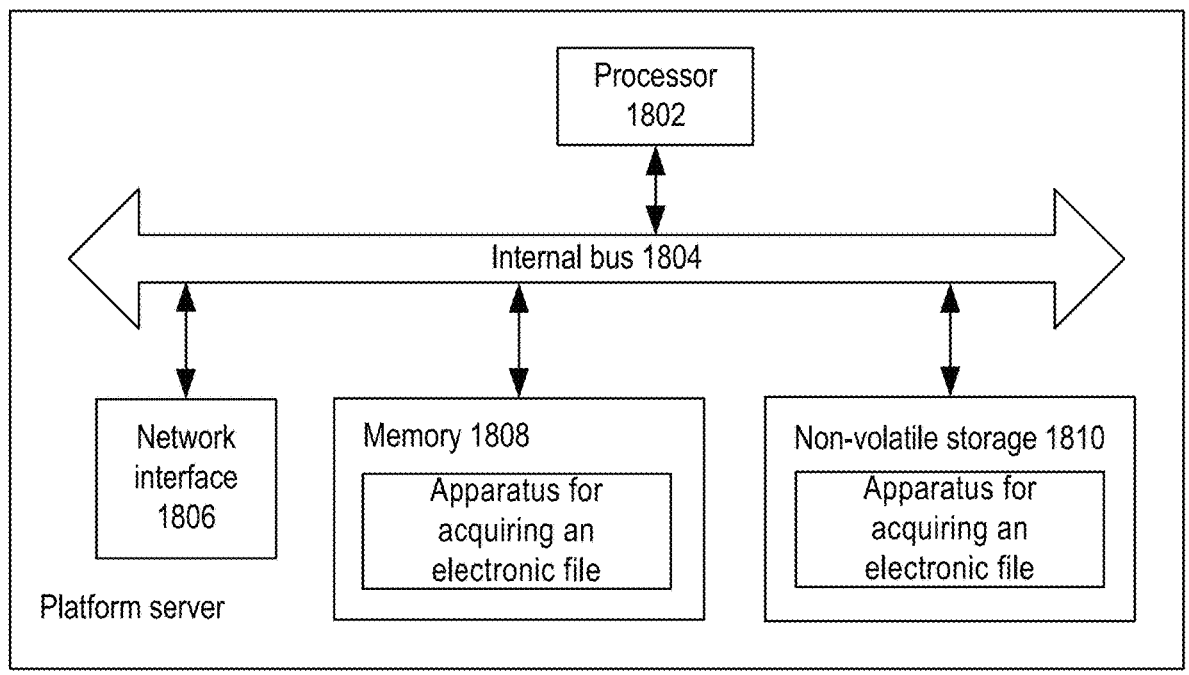
FIG. 18 is a block diagram illustrating a platform server according to some embodiments of the disclosure.

Corresponding to the aforementioned method for acquiring an electronic file, the disclosure further provides a block diagram illustrating a platform server according to an exemplary embodiment of the disclosure shown in FIG. 18. Please refer to FIG. 18, the server includes a processor 1802, an internal bus 1804, a network interface 1806, a memory 1808, and a non-volatile storage 1810 on the hardware level, and certainly may also include hardware required by other services. The processor 1802 reads a corresponding computer program into the memory 1808 from the non-volatile storage 1810 and then runs the computer program, so as to form an apparatus for acquiring an electronic file on the logical level. In addition to the software implementation, the disclosure may certainly include other implementations, for example, using a logical device or a combination of software and hardware. That is to say, execution bodies of the following processing flows are not limited to logical units, and may also be hardware or logical devices.

Figure 19:
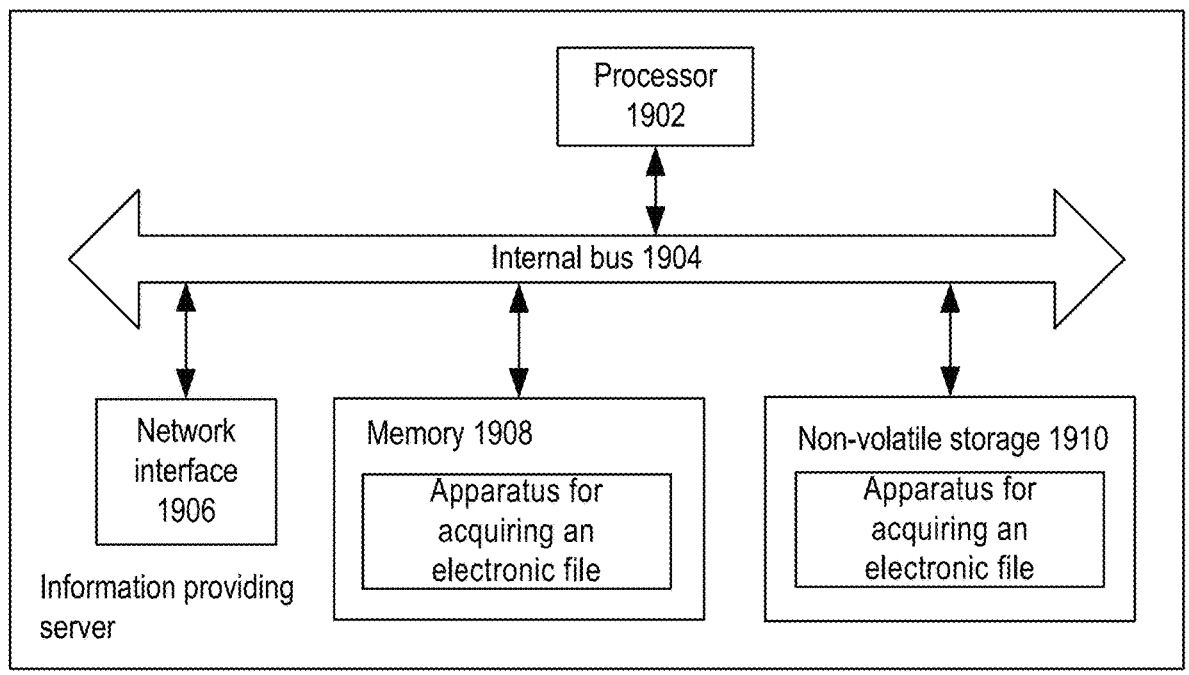
FIG. 19 is a block diagram illustrating an information providing server according to some embodiments of the disclosure.

Corresponding to the aforementioned method for acquiring an electronic file, the disclosure further provides a block diagram illustrating an information providing server according to an exemplary embodiment of the disclosure shown in FIG. 19. Please refer to FIG. 19, the server includes a processor 1902, an internal bus 1904, a network interface 1906, a memory 1908, and a non-volatile storage 1910 on the hardware level, and certainly may also include hardware required by other services. The processor reads a corresponding computer program into the memory from the non-volatile storage and then runs the computer program, so as to form an apparatus for acquiring an electronic file on the logical level. In addition to the software implementation, the disclosure may certainly include other implementations, for example, using a logical device or a combination of software and hardware. That is to say, execution bodies of the following processing flows are not limited to logical units, and may also be hardware or logical devices.

Figure 20:
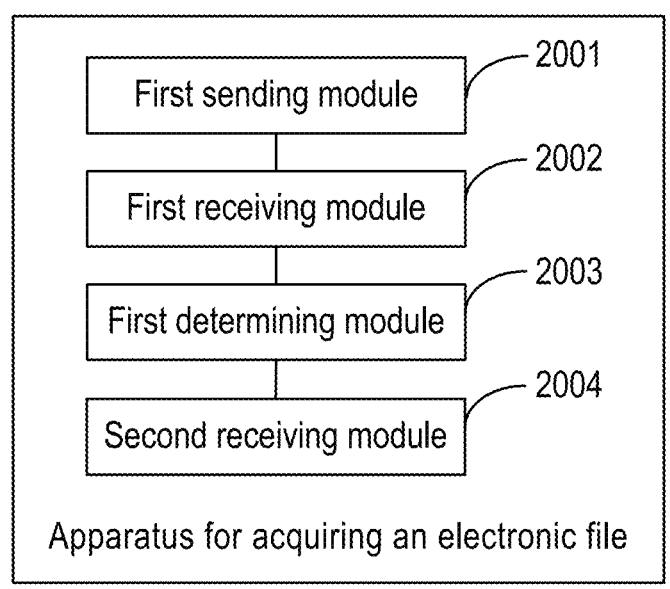
FIG. 20 is a block diagram illustrating an apparatus for acquiring an electronic file shown according to some embodiments of the disclosure.

Please refer to FIG. 20, a block diagram illustrating an apparatus for acquiring an electronic file shown according to some embodiments of the disclosure. In a software implementation, the apparatus for acquiring an electronic file may include: a first sending module 2001, a first receiving module 2002, a first determining module 2003, and a second receiving module 2004, where the first sending module 2001 is configured to send a first request message for acquiring an electronic file to a platform server, wherein the first request message carries a first identifier of an information providing server providing the electronic file; the first receiving module 2002 is configured to receive first prompt information returned from the platform server according to the first request message sent by the first sending module 2001; the first determining module 2003 is configured to determine first verification information for identity authentication according to the first prompt information received by the first receiving module 2002, and send the first verification information to the platform server; and the second receiving module 2004 is configured to receive the electronic file from the information providing server that is forwarded by the platform server after the platform server determines the information providing server according to the first identifier, determines a user identifier registered by a user of a terminal device with the information providing server according to first login information of the user on the platform server, and sends the first verification information determined by the first determining module 2003 and the user identifier to the information providing server, wherein private information in the electronic file is encrypted through a first encryption key of the information providing server.

Figure 21:
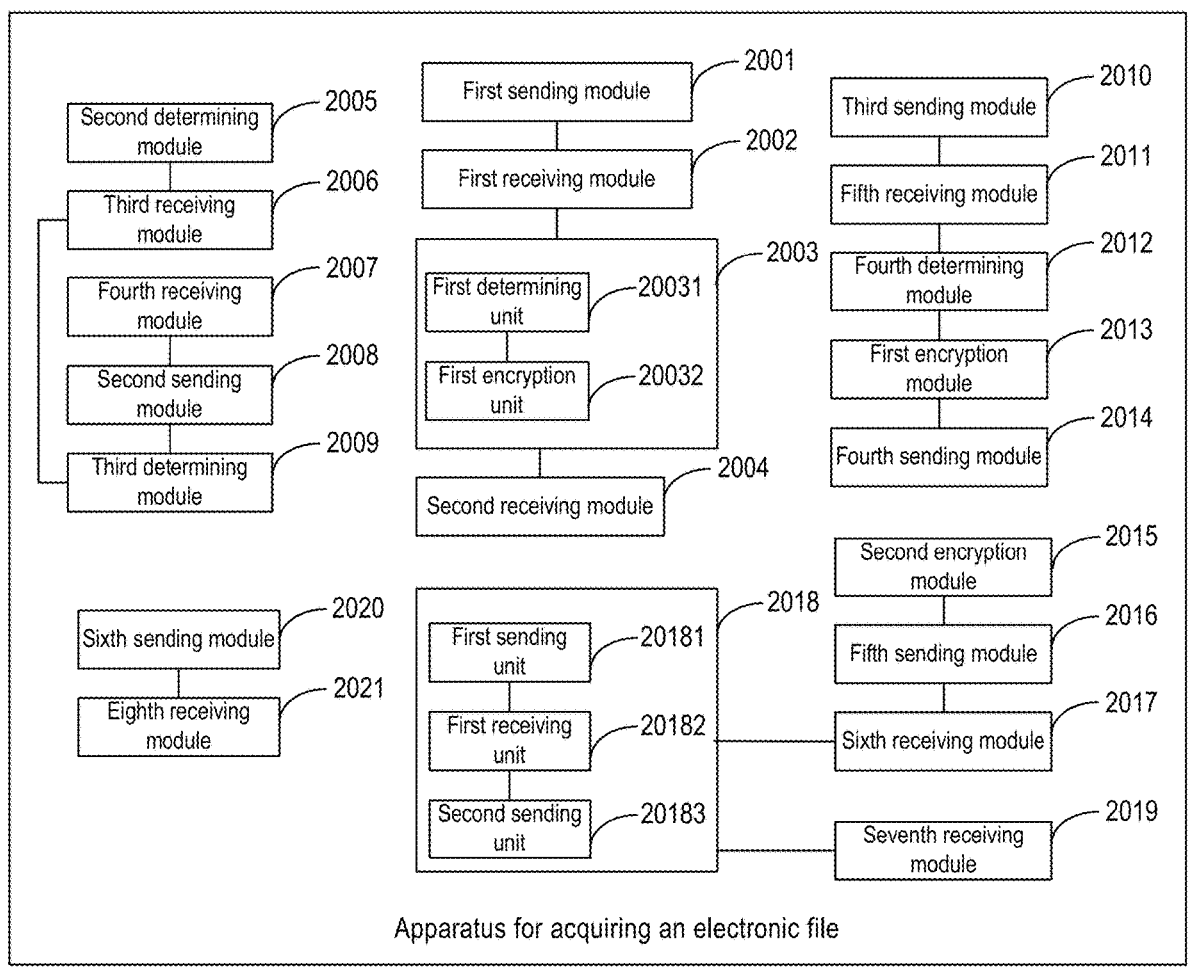
FIG. 21 is a block diagram illustrating an apparatus for acquiring an electronic file shown according to some embodiments of the disclosure.

Please refer to FIG. 21, a block diagram illustrating an apparatus for acquiring an electronic file shown according to some embodiments of the disclosure. On the basis of the aforementioned embodiment shown in FIG. 20, the first determining module 2003 may include: a first determining unit 20031, configured to determine, according to the first prompt information, first original verification information input by the user at the terminal device and determine the first encryption key of the information providing server; and a first encryption unit 20032, configured to encrypt the first original verification information according to the first encryption key that is determined by the first determining unit 20031, so as to obtain the first verification information for identity authentication.

In one embodiment, the apparatus may further include: a second determining module 2005, configured to determine the first login information of the user when the user has not logged into the platform server, and log into the platform server through the first login information; and a third receiving module 2006, configured to, after the second determining module 2005 determines that the user login is successful, receive a first response message indicating a successful login returned by the platform server.

In one embodiment, the apparatus may further include: a fourth receiving module 2007, configured to receive a first verification code from the information providing server through a first mobile phone number, wherein the first verification code is sent to the first mobile phone number by the information providing server under the instruction of the platform server according to a second mobile phone number, and the second mobile phone number is obtained by encrypting the first mobile phone number through the first encryption key; a second sending module 2008, configured to send to the platform server the first verification code received by the fourth receiving module 2007 through the second mobile phone number; and a third determining module 2009, configured to determine that the user login is successful after the platform server verifies the first verification code sent by the second sending module 2008 and a second verification code from the information providing server, wherein the third receiving module 2006 performs the step of receiving a first response message indicating a successful login returned by the platform server.

In one embodiment, the apparatus may further include: a third sending module 2010, configured to send an association request to the platform server when the first login information of the user on the platform server is not bound to the user identifier, wherein the association request carries the first identifier of the information providing server; a fifth receiving module 2011, configured to receive second prompt information returned from the platform server according to the association request sent by the third sending module 2010; a fourth determining module 2012, configured to determine, according to the second prompt information received by the fifth receiving module 2011, second original verification information input by the user at the terminal device; a first encryption module 2013, configured to encrypt the second original verification information determined by the fourth determining module 2012 according to the first encryption key, so as to obtain second verification information for identity authentication; and a fourth sending module 2014, configured to send to the platform server the second verification information encrypted by the first encryption module 2013, wherein the platform server forwards a binding request and the second verification information to the information providing server, so that the information providing server decrypts the second verification information according to a first decryption key corresponding to the first encryption key, determines the user identifier of the user on the information providing server according to the decrypted second verification information, and returns the user identifier to the platform server, so that the platform server may establish a binding relationship between the first login information and the user identifier.

In one embodiment, the apparatus may further include: a second encryption module 2015, configured to, when the user has not registered with the platform server and the information providing server, encrypt first registration information needed to be registered by the user of the terminal device with the information providing server through a second encryption key of the platform server; a fifth sending module 2016, configured to send to the information providing server the first registration information encrypted through the second encryption key after the user logs into the information providing server through a first mobile phone number; a sixth receiving module 2017, configured to receive the first encryption key from the information providing server, a first response message indicating a successful registration, and a second mobile phone number after the information providing server generates the user identifier according to the first mobile phone number, wherein the second mobile phone number is generated by encrypting the first mobile phone number through the first encryption key; a first registration module 2018, configured to perform a registration with the platform server through the second mobile phone number; and a seventh receiving module 2019, configured to, after the platform server registers the second mobile phone number, receive a second response message indicating a successful registration returned by the platform server.

In one embodiment, the apparatus further includes: a sixth sending module 2020, configured to send to the platform server a second request message for acquiring the second encryption key of the platform server; and an eighth receiving module 2021, configured to receive the second encryption key returned by the platform server according to the second request message sent by the sixth sending module 2020.

In one embodiment, the first registration module 2018 may include: a first sending unit 20181, configured to send the second mobile phone number to the platform server; a first receiving unit 20182, configured to receive a third verification code returned from the information providing server, wherein the third verification code is sent to the terminal device by the information providing server at the request of the platform server according to the second mobile phone number sent by the first sending unit; and a second sending unit 20183, configured to send to the platform server the third verification code received by the first receiving unit 20182, where after the platform server compares the third verification code with a fourth verification code returned by the information providing server to the platform server to determine that verification is successful, the seventh receiving module 2019 performs the step of receiving a second response message indicating a successful registration returned by the platform server.

Figure 22:
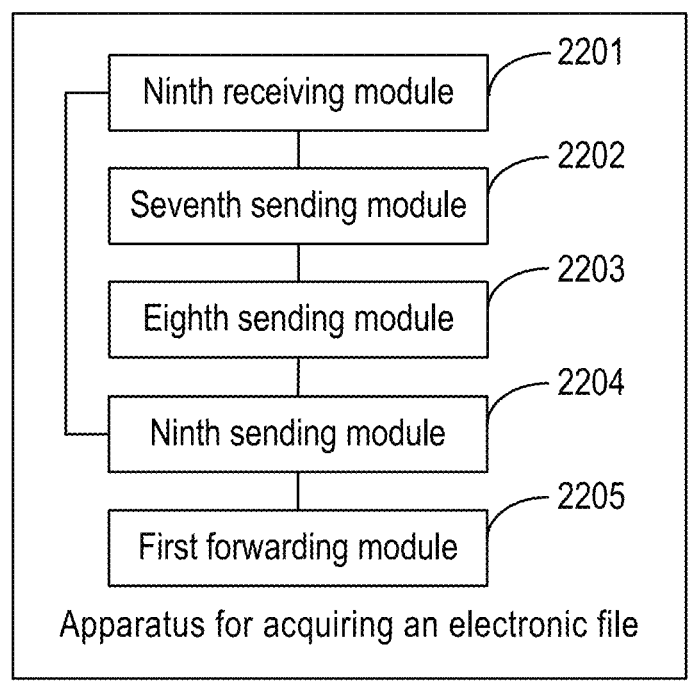
FIG. 22 is a block diagram illustrating an apparatus for acquiring an electronic file shown according to some embodiments of the disclosure.

FIG. 22 is a block diagram illustrating an apparatus for acquiring an electronic file shown according to a further exemplary embodiment 1. In a software implementation, the apparatus for acquiring an electronic file may include: a ninth receiving module 2201, a seventh sending module 2202, an eighth sending module 2203, a ninth sending module 2204, and a first forwarding module 2205; the ninth receiving module 2201 is configured to receive a first request message for acquiring an electronic file from a terminal device, wherein the first request message carries a first identifier of an information providing server providing the electronic file; the seventh sending module 2202 is configured to return first prompt information to the terminal device according to the first request message received by the ninth receiving module 2201; the eighth sending module 2203 is configured to receive the first verification information from the terminal device after the terminal device determines first verification information for identity authentication according to the first prompt information sent by the seventh sending module 2202; the ninth sending module 2204 is configured to determine the information providing server according to the first identifier received by the ninth receiving module 2201, and send to the information providing server the first verification information received by the eighth sending module 2203 and a user identifier registered by a user of the terminal device with the information providing server; and the first forwarding module 2205 is configured to receive the electronic file from the information providing server and forward the electronic file to the terminal device after the information providing server successfully verifies the first verification information sent by the ninth sending module 2204 and the electronic file is determined according to the user identifier wherein private information in the electronic file is encrypted through a first encryption key of the information providing server.

Figure 23:
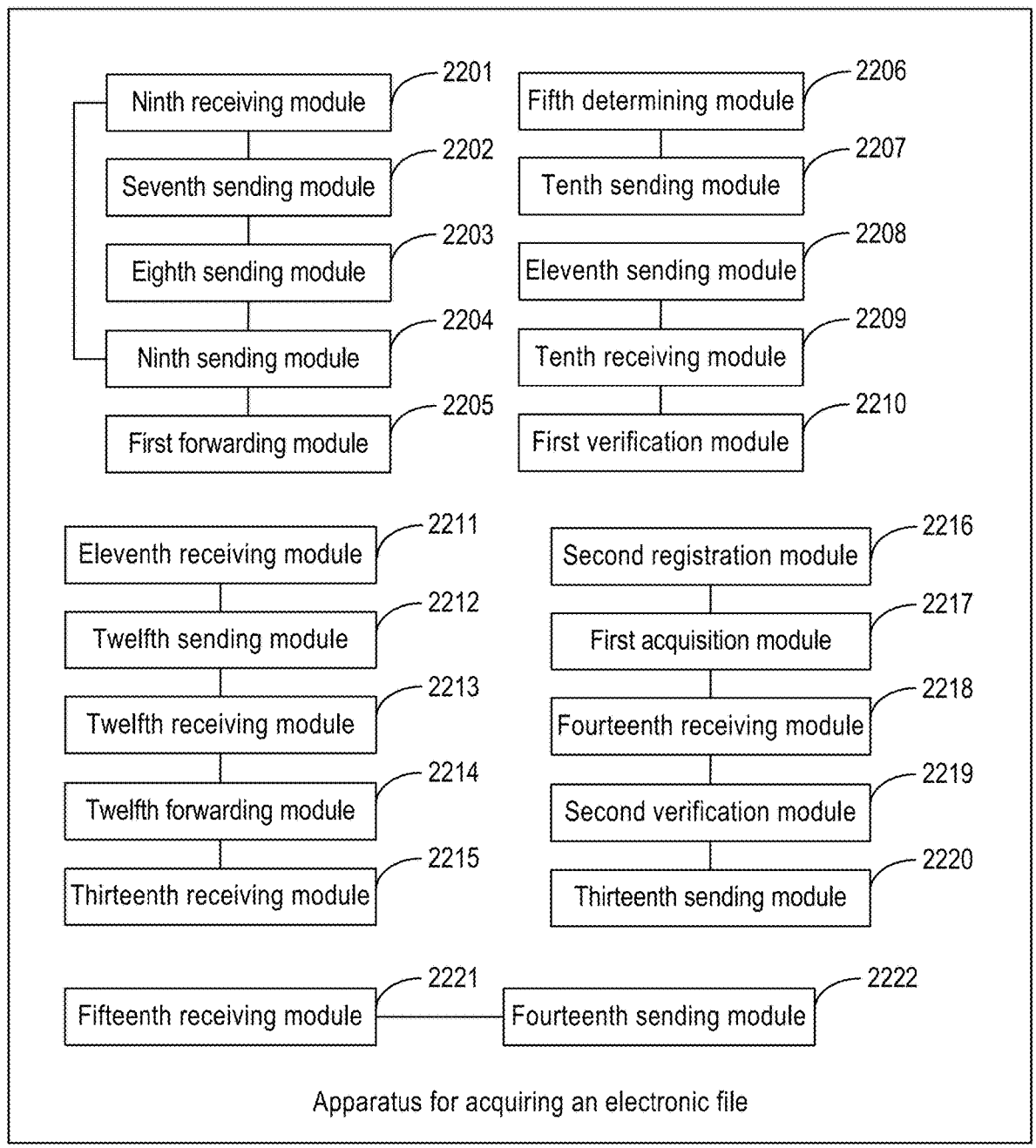
FIG. 23 is a block diagram illustrating an apparatus for acquiring an electronic file shown according to some embodiments of the disclosure.

FIG. 23 is a block diagram illustrating an apparatus for acquiring an electronic file shown according to a further exemplary embodiment 2. On the basis of the aforementioned embodiment shown in FIG. 22, the first verification information is generated by encrypting original verification information input by the user at the terminal device through the first encryption key.

In one embodiment, the apparatus may further include: a fifth determining module 2206, configured to determine first login information of the user on the platform server when the user has not logged into the platform server; and a tenth sending module 2207, configured to, after the fifth determining module 2206 determines that the user login is successful, return a first response message indicating a successful login to the terminal device.

In one embodiment, the apparatus may further include: an eleventh sending module 2208, configured to instruct the information providing server to send a first verification code to the terminal device through a second mobile phone number registered by the user of the terminal device with the platform server, wherein the second mobile phone number is obtained by encrypting a first mobile phone number through the first encryption key, and the first mobile phone number is a number registered by the user with the information providing server; a tenth receiving module 2209, configured to receive the first verification code from the terminal device and a second verification code from the information providing server after the information providing server decrypts the second mobile phone number through a first decryption key of the information providing server to obtain the first mobile phone number, and instructs the terminal device to send the first verification code through the first mobile phone number; and a first verification module 2210, configured to verify the first verification code and the second verification code, and after a successful verification, determine that the user login is successful, and the tenth sending module 2209 performs the step of returning a first response message indicating a successful login to the terminal device.

In one embodiment, the apparatus may further include: an eleventh receiving module 2211, configured to receive an association request from the terminal device when first login information of the user on the platform server is not bound to the user identifier registered by the user at the information providing server, wherein the association request carries the first identifier; a twelfth sending module 2212, configured to return second prompt information to the terminal device according to the association request; a twelfth receiving module 2213, configured to, after the terminal device determines second verification information for identity authentication according to the second prompt information, receive the second verification information returned from the terminal device according to the second prompt information, wherein the second verification information is encrypted through the first encryption key; a second forwarding module 2214, configured to forward a binding request and the second verification information encrypted through the first encryption key to the information providing server, so that the information providing server decrypts the second verification information encrypted through the first encryption key, and determines the user identifier registered by the user with the information providing server according to the decrypted second verification information; and a thirteenth receiving module 2215, configured to receive the user identifier returned from the information providing server, and establish a binding relationship between the first login information and the user identifier.

In one embodiment, the apparatus may further include: a second registration module 2216, configured to perform a registration through second registration information from the terminal device when the user has not registered with the platform server; a first acquisition module 2217, configured to acquire a third verification code from the information providing server according to the second registration information registered by the second registration module 2216, and instruct the information providing server to send a fourth verification code to a first mobile phone number corresponding to the second mobile phone number; a fourteenth receiving module 2218, configured to receive the fourth verification code from the terminal device; a second verification module 2219, configured to verify the third verification code and the fourth verification code; and a thirteenth sending module 2220, configured to return a second response message indicating a successful registration to the terminal device after the second verification module 2219 successfully verifies the third verification code and the fourth verification code.

In one embodiment, the apparatus may further include: a fifteenth receiving module 2221, configured to receive a second request message for acquiring a second encryption key of the platform server from the terminal device; and a fourteenth sending module 2222, configured to return the second encryption key to the terminal device according to the second request message received by the fifteenth receiving module 2221.

Figure 24:
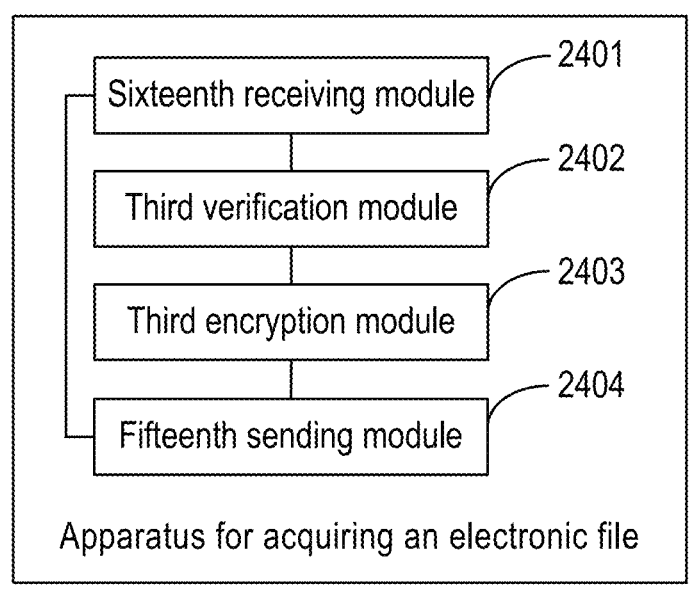
FIG. 24 is a block diagram illustrating an apparatus for acquiring an electronic file shown according to some embodiments of the disclosure.

FIG. 24 is a block diagram illustrating an apparatus for acquiring an electronic file shown according to another exemplary embodiment 1. In a software implementation, the apparatus for acquiring an electronic file may include: a sixteenth receiving module 2401, a third verification module 2402, a third encryption module 2403, and a fifteenth sending module 2404, where the sixteenth receiving module 2401 is configured to receive first verification information from a platform server and a user identifier registered by a user of a terminal device with the information providing server; the third verification module 2402 is configured to verify the first verification information received by the sixteenth receiving module 2401, and determine the electronic file according to the user identifier after a successful verification; the third encryption module 2403 is configured to encrypt private information in the electronic file determined by the third verification module 2402 through a first encryption key of the information providing server; and the fifteenth sending module 2404 is configured to send the electronic file encrypted by the third encryption module 2403 to the platform server, so that the platform server forwards the electronic file to the terminal device.

Figure 25:
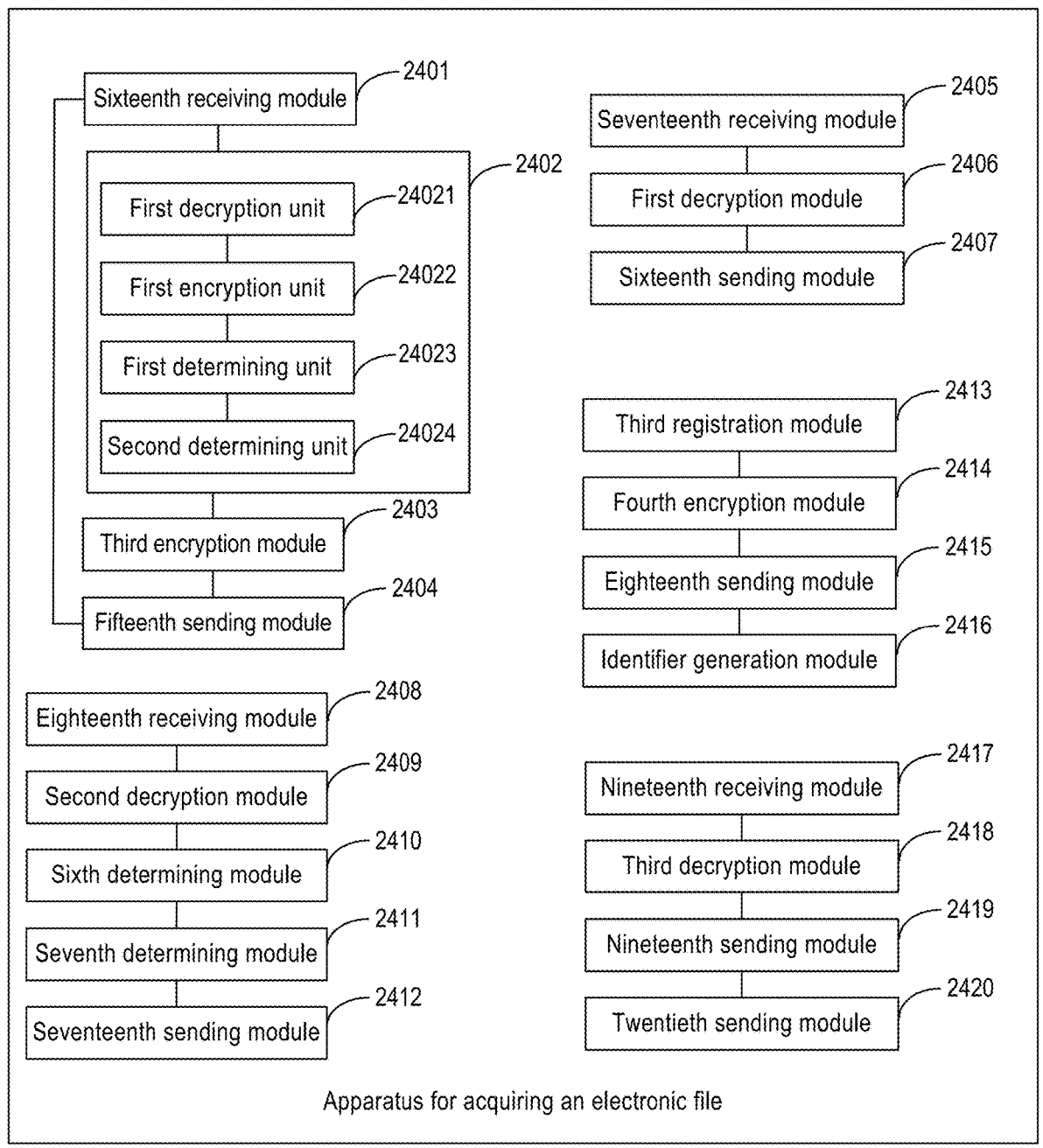
FIG. 25 is a block diagram illustrating an apparatus for acquiring an electronic file shown according to some embodiments of the disclosure.

FIG. 25 is a block diagram illustrating an apparatus for acquiring an electronic file shown according to another exemplary embodiment 2. On the basis of the aforementioned embodiment shown in FIG. 24, the third verification module 2402 includes: a first decryption unit 24021, configured to decrypt the first verification information through a first decryption key of the information providing server; a first encryption unit 24022, configured to encrypt the first verification information decrypted by the first decryption unit through a second encryption key of the platform server, so as to obtain a first encrypted character string; a first determining unit 24023, configured to determine a second encrypted character string generated when the user registers with the information providing server, wherein the second encrypted character string is generated by encrypting the first verification information through the second encryption key of the platform server; and a second determining unit 24024, configured to determine whether the first encrypted character string obtained by the first encryption unit 24022 and the second encrypted character string determined by the first determining unit 24023 are the same; if so, the verification on the first verification information is successful.

In one embodiment, the apparatus may further include: a seventeenth receiving module 2405, configured to, when the user has not logged into the platform server, receive an instruction message from the platform server for instructing the information providing server to send a first verification code to a second mobile phone number registered by the user with the platform server, wherein the second mobile phone number is obtained by encrypting a first mobile phone number through the first encryption key, and the first mobile phone number is a number registered by the user with the information providing server; a first decryption module 2406, configured to decrypt the second mobile phone number through a first decryption key according to the instruction message received by the seventeenth receiving module 2405, so as to obtain the first mobile phone number; and a sixteenth sending module 2407, configured to send the first verification code to the terminal device through the first mobile phone number and return a second verification code to the platform server, so that the platform server performs a login verification on the user according to the first verification code and the second verification code.

In one embodiment, the apparatus may further include: an eighteenth receiving module 2408, configured to receive second verification information from the platform server and a second encryption key of the platform server when first login information of the user on the platform server is not bound to the user identifier, wherein the second verification information is encrypted through the first encryption key; a second decryption module 2409, configured to decrypt the second verification information through a first decryption key of the information providing server, and encrypt decrypted second original verification information through the second encryption key, so as to obtain a third encrypted character string; a sixth determining module 2410, configured to determine a fourth encrypted character string generated when the user registers with the information providing server, wherein the fourth encrypted character string is generated by encrypting the second original verification information through the second encryption key of the platform server; a seventh determining module 2411, configured to determine whether the third encrypted character string and the fourth encrypted character string are the same; and a seventeenth sending module 2412, configured to, if the seventh determining module 2411 determines that the third encrypted character string and the fourth encrypted character string are the same, return to the platform server the user identifier registered by the user of the terminal device with the information providing server, so that the platform server establishes a binding relationship between the first login information and the user identifier.

In one embodiment, the apparatus may further include: a third registration module 2413, configured to perform a registration through first registration information from the terminal device when the user has not registered with the information providing server; a fourth encryption module 2414, configured to encrypt a first mobile phone number through the first encryption key to obtain a second mobile phone number after the user logs into the information providing server through the first mobile phone number; an eighteenth sending module 2415, configured to send the second mobile phone number to the terminal device, so that the terminal device registers with the platform server through the second mobile phone number; and an identifier generation module 2416, configured to generate the user identifier according to the first mobile phone number.

In one embodiment, the apparatus may further include: a nineteenth receiving module 2417, configured to receive the second mobile phone number from the platform server; a third decryption module 2418, configured to decrypt the second mobile phone number through a first decryption key to obtain the first mobile phone number; a nineteenth sending module 2419, configured to return a third verification code to the terminal device through the first mobile phone number, wherein the third verification code is sent to the terminal device by the information providing server at the request of the platform server according to second registration information; and a twentieth sending module 2420, configured to return a fourth verification code to the platform server, so that the platform server compares the third verification code with the fourth verification code to determine whether verification is successful.

As can be seen from the aforementioned embodiments, when a user needs to register with an information providing server, relevant information of the user is encrypted through a second encryption key of a platform server. When the user registers with the platform server, relevant information of the user (including private information in an electronic file) is encrypted through a first encryption key of the information providing server; when initiating an association request and viewing an electronic file, the platform server needs to send encrypted information to the information providing server for decryption and then verification; or the information providing server decrypts information and then sends it back to the platform server for verification, so that when private data on the information providing server is leaked, a thief cannot obtain original data. Similarly, even if data on the platform server is leaked, a thief cannot obtain original data. In addition, the platform server can further complete identity authentication with the assistance of the information providing server. Through the design, private information of the user can be protected effectively and the identity authentication is also made possible.

Those skilled in the art can easily think of other implementation solutions of the disclosure after considering the specification and practicing the invention disclosed here. The disclosure is intended to cover any variations, uses, or adaptive changes of the disclosure. These variations, uses, or adaptive changes follow general principles of the disclosure and include common knowledge or conventional technical means in the art that is not disclosed in the disclosure. The specification and embodiments are considered exemplary only, and the true scope and spirit of the disclosure will be indicated by the following claims.

It should be noted that the term "include", "comprise", or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ", without further limitation, does not preclude the presence of additional identical elements in the process, method, commodity, or device that includes the element.

The above descriptions are merely preferred embodiments of the disclosure, and are not intended to limit the disclosure. Any alterations, equivalent substitutions, improvements and the like made within the spirit and principle of the disclosure shall fall within the protection scope of the disclosure.

What is claimed is:

1. A method comprising:
    sending, by a terminal device, a first request message for acquiring an electronic file to a platform server, the first request message including a first identifier of an information providing server providing the electronic file;
    receiving, at the terminal device, first prompt information returned from the platform server according to the first request message;
    determining, by the terminal device, first verification information for identity authentication based on the first prompt information;
    retrieving, by the terminal device, a first encryption key from the information providing server;
    encrypting, by the terminal device, the first verification information using the first encryption key;
    sending, by the terminal device, the encrypted first verification information to the platform server;
    receiving, at the terminal device, the electronic file forwarded by the platform server, wherein the electronic file is from the information providing server, and wherein private information in the electronic file is encrypted through the first encryption key of the information providing server.

2. The method of claim 1, wherein determining first verification information for identity authentication based on the first prompt information comprises:
    determining, by the terminal device and according to the first prompt information, first original verification information input by a user at the terminal device and determining the first encryption key of the information providing server; and
    encrypting, at the terminal device, the first original verification information according to the first encryption key, so as to obtain the first verification information for identity authentication.

3. The method of claim 1, further comprising:
    logging into the platform server, by the terminal device, using first login information;
    receiving, at the terminal device, a first verification code from the information providing server through a first mobile phone number, wherein the first verification code is sent to the first mobile phone number by the information providing server under the instruction of the platform server according to a second mobile phone number, the second mobile phone number is obtained by encrypting the first mobile phone number using the first encryption key;

sending, by the terminal device, the first verification code to the platform server; and receiving, at the terminal device, a first response message indicating a successful login returned by the platform server.

4. The method of claim 1, further comprising:

encrypting, by the terminal device, first registration information of a user of the terminal device needed to be registered with the information providing server through a second encryption key of the platform server when the user has not registered with the platform server and the information providing server;

sending, by the terminal device, the first registration information encrypted through the first encryption key to the information providing server after the user logs into the information providing server through a first mobile phone number;

receiving, at the terminal device, the first encryption key from the information providing server, a first response message indicating a successful registration, and a second mobile phone number after the information providing server generates a user identifier according to the first mobile phone number, wherein the second mobile phone number is generated by encrypting the first mobile phone number through the first encryption key;

performing, by the terminal device, a registration at the platform server through the second mobile phone number; and receiving, by the terminal device, a second response message indicating a successful registration returned by the platform server after the second mobile phone number is registered with the platform server.

5. The method of claim 4, further comprising:

sending, by the terminal device, to the platform server a second request message for acquiring the second encryption key of the platform server; and receiving, at the terminal device, the second encryption key returned by the platform server according to the second request message.

6. The method of claim 4, wherein performing a registration at the platform server through the second mobile phone number comprises:

sending, by the terminal device, the second mobile phone number to the platform server;

receiving, at the terminal device, a third verification code returned from the information providing server, wherein the third verification code is received at the terminal device by the information providing server at the request of the platform server according to the second mobile phone number;

sending, by the terminal device, the third verification code to the platform server; and receiving, at the terminal device, a second response message indicating a successful registration returned by the platform server after the platform server compares the third verification code with a fourth verification code returned by the information providing server to the platform server and determine that a verification is successful.

7. A method comprising:

receiving, at a platform server, a first request message for acquiring an electronic file from a terminal device;

parsing, by the platform server, the first request message to extract a first identifier of an information providing server providing the electronic file;

returning, by the platform server, first prompt information to the terminal device according to the first request message;

receiving, at the platform server, encrypted first verification information from the terminal device after the terminal device determines the first verification information for identity authentication according to the first prompt information, the first verification information encrypted by the terminal device using a first encryption key associated with the information providing server, the first encryption key comprising a key stored at the information providing server;

determining, by the platform server, the information providing server according to the first identifier;

sending, by the platform server to the information providing server, the first verification information and a user identifier registered by a user of the terminal device with the information providing server;

receiving, at the platform server, the electronic file from the information providing server after the information providing server successfully verifies the first verification information and the electronic file is determined according to the user identifier; and forwarding, by the platform server, the electronic file to the terminal device, wherein private information in the electronic file is encrypted through the first encryption key of the information providing server.

8. The method of claim 7, wherein the first verification information is generated by encrypting original verification information input by the user at the terminal device through the first encryption key.

9. The method of claim 7, further comprising:

determining, by the platform server, first login information of the user on the platform server when the user has not logged into the platform server; and returning, by the platform server, a first response message indicating a successful login to the terminal device after the user login is successful.

10. The method of claim 9, further comprising:

instructing, by the platform server, the information providing server to send a first verification code to the terminal device through a second mobile phone number registered by the user of the terminal device with the platform server, wherein the second mobile phone number is obtained by encrypting a first mobile phone number through the first encryption key, and the first mobile phone number is a number registered by the user at the information providing server;

receiving, by the platform server, the first verification code from the terminal device and receiving a second verification code from the information providing server after the information providing server decrypts the second mobile phone number through a first decryption key of the information providing server so as to obtain the first mobile phone number and sends the first verification code to the terminal device through the first mobile phone number;

verifying, by the platform server, the first verification code and the second verification code;

determining, by the platform server, that the user login is successful after a successful verification; and returning, by the platform server, a first response message indicating a successful login to the terminal device.

11. The method of claim 7, further comprising:

receiving, by the platform server, an association request from the terminal device when first login information of the user on the platform server is not bound to the user identifier registered by the user with the information providing server, wherein the association request carries the first identifier;

returning, by the platform server, second prompt information to the terminal device according to the association request;

receiving, by the platform server, the second verification information returned from the terminal device according to the second prompt information after the terminal device determines second verification information for identity authentication according to the second prompt information, wherein the second verification information is encrypted through the first encryption key;

forwarding, by the platform server to the information providing server, the binding request and the second verification information encrypted through the first encryption key, causing the information providing server to decrypt the second verification information encrypted by through the first encryption key and determine the user identifier registered by the user with the information providing server according to the decrypted second verification information; and receiving, at the platform server, the user identifier returned from the information providing server, and establishing a binding relationship between the first login information and the user identifier.

12. The method of claim 7, further comprising:

performing, by the platform server, a registration through second registration information from the terminal device when the user has not registered with the platform server;

acquiring, by the platform server, a third verification code from the information providing server according to the second registration information;

instructing, by the platform server, the information providing server to send a fourth verification code to a first mobile phone number corresponding to the second mobile phone number;

receiving, by the platform server, the fourth verification code from the terminal device;

verifying, by the platform server, the third verification code and the fourth verification code; and returning, by the platform server, to the terminal device a second response message indicating a successful registration after the platform server successfully verifies the third verification code and the fourth verification code.

13. The method of claim 12, further comprising:

receiving, by the platform server, a second request message from the terminal device for acquiring a second encryption key of the platform server; and returning, by the platform server, the second encryption key to the terminal device according to the second request message.

14. An apparatus comprising:

a processor;

a storage medium for tangibly storing thereon program logic for execution by the processor, the stored program logic comprising:

logic, executed by the processor, for receiving a first request message for acquiring an electronic file from a terminal device;

logic, executed by the processor, for parsing the first request message to extract a first identifier of an information providing server providing the electronic file;

logic, executed by the processor, for returning first prompt information to the terminal device according to the first request message;

logic, executed by the processor, for receiving encrypted first verification information from the terminal device after the terminal device determines the first verification information for identity authentication according to the first prompt information, the first verification information encrypted by the terminal device using a first encryption key associated with the information providing server, the first encryption key comprising a key stored at the information providing server;

logic, executed by the processor, for determining the information providing server according to the first identifier;

logic, executed by the processor, for sending, by the platform server to the information providing server, the first verification information and a user identifier registered by a user of the terminal device with the information providing server;

logic, executed by the processor, for receiving the electronic file from the information providing server after the information providing server successfully verifies the first verification information and the electronic file is determined according to the user identifier; and logic, executed by the processor, for forwarding the electronic file to the terminal device, wherein private information in the electronic file is encrypted through the first encryption key of the information providing sever.

15. The apparatus of claim 14, wherein the first verification information is generated by encrypting original verification information input by the user at the terminal device through the first encryption key.

16. The apparatus of claim 14, further comprising:

logic, executed by the processor, for determining first login information of the user on the platform server when the user has not logged into the platform server; and logic, executed by the processor, for returning a first response message indicating a successful login to the terminal device after the user login is successful.

17. The apparatus of claim 16, further comprising:

logic, executed by the processor, for instructing the information providing server to send a first verification code to the terminal device through a second mobile phone number registered by the user of the terminal device with the platform server, wherein the second mobile phone number is obtained by encrypting a first mobile phone number through the first encryption key, and the first mobile phone number is a number registered by the user at the information providing server;

logic, executed by the processor, for receiving the first verification code from the terminal device and receiving a second verification code from the information providing server after the information providing server decrypts the second mobile phone number through a first decryption key of the information providing server so as to obtain the first mobile phone number and sends the first verification code to the terminal device through the first mobile phone number;

logic, executed by the processor, for verifying the first verification code and the second verification code;

logic, executed by the processor, for determining that the user login is successful after a successful verification; and logic, executed by the processor, for returning a first response message indicating a successful login to the terminal device.

18. The apparatus of claim 14, further comprising:

logic, executed by the processor, for receiving an association request from the terminal device when first login information of the user on the platform server is not bound to the user identifier registered by the user with the information providing server, wherein the association request carries the first identifier;

logic, executed by the processor, for returning second prompt information to the terminal device according to the association request;

logic, executed by the processor, for receiving the second verification information returned from the terminal device according to the second prompt information after the terminal device determines second verification information for identity authentication according to the second prompt information, wherein the second verification information is encrypted through the first encryption key;

logic, executed by the processor, for forwarding, by the platform server to the information providing server, the binding request and the second verification information encrypted through the first encryption key, causing the information providing server to decrypt the second verification information encrypted by through the first encryption key and determine the user identifier registered by the user with the information providing server according to the decrypted second verification information; and logic, executed by the processor, for receiving the user identifier returned from the information providing server, and establishing a binding relationship between the first login information and the user identifier.

19. The apparatus of claim 14, further comprising:

logic, executed by the processor, for performing a registration through second registration information from the terminal device when the user has not registered with the platform server;

logic, executed by the processor, for acquiring a third verification code from the information providing server according to the second registration information;

logic, executed by the processor, for instructing the information providing server to send a fourth verification code to a first mobile phone number corresponding to the second mobile phone number;

logic, executed by the processor, for receiving the fourth verification code from the terminal device;

logic, executed by the processor, for verifying the third verification code and the fourth verification code; and logic, executed by the processor, for returning to the terminal device a second response message indicating a successful registration after the platform server successfully verifies the third verification code and the fourth verification code.

20. The apparatus of claim 19, further comprising:

logic, executed by the processor, for receiving a second request message from the terminal device for acquiring a second encryption key of the platform server; and logic, executed by the processor, for returning the second encryption key to the terminal device according to the second request message.

\* \* \* \* \*